United States Patent
Contractor et al.

(10) Patent No.: US 11,312,170 B2
(45) Date of Patent: Apr. 26, 2022

(54) IN-LINE PRIMER PRINTING METHODS

(71) Applicant: Kao Corporation, Tokyo (JP)

(72) Inventors: Muslim Contractor, Mason, OH (US); Stephen Buchanan, Mason, OH (US); Stephen Cummings, Mason, OH (US)

(73) Assignee: Kao Corporation, Tokyo (JP)

(*) Notice: Subject to any disclaimer, the term of this patent is extended or adjusted under 35 U.S.C. 154(b) by 39 days.

(21) Appl. No.: 16/977,581

(22) PCT Filed: Apr. 4, 2019

(86) PCT No.: PCT/US2019/025766
§ 371 (c)(1),
(2) Date: Sep. 2, 2020

(87) PCT Pub. No.: WO2019/195539
PCT Pub. Date: Oct. 10, 2019

(65) Prior Publication Data
US 2020/0407574 A1 Dec. 31, 2020

Related U.S. Application Data

(60) Provisional application No. 62/653,083, filed on Apr. 5, 2018.

(51) Int. Cl.
*B41M 5/00* (2006.01)
*C09D 11/101* (2014.01)
*C09D 11/322* (2014.01)
*C09D 11/40* (2014.01)
*B41M 7/00* (2006.01)

(52) U.S. Cl.
CPC ........ *B41M 7/0081* (2013.01); *B41M 5/0023* (2013.01); *C09D 11/101* (2013.01); *C09D 11/322* (2013.01); *C09D 11/40* (2013.01)

(58) Field of Classification Search
CPC ....... C09D 11/101; C09D 11/38; C09D 11/30; C09D 11/322; B41M 3/008; B41M 5/0047; B41M 7/0081; B41J 2/2117; B41J 2/2107; B41J 11/0015; B41J 11/0021
See application file for complete search history.

(56) References Cited

U.S. PATENT DOCUMENTS

| | | |
|---|---|---|
| 5,833,744 A | 11/1998 | Breton et al. |
| 7,635,504 B2 | 12/2009 | Elwakil et al. |
| 8,975,307 B2 | 3/2015 | Gould et al. |
| 2002/0198289 A1 | 12/2002 | Gummeson |
| 2004/0189772 A1* | 9/2004 | Arai .................. B41J 11/00214 347/102 |
| 2007/0078195 A1* | 4/2007 | Kobayashi ............. C08F 2/50 522/71 |
| 2007/0259986 A1 | 11/2007 | Elwakil et al. |
| 2008/0076846 A1* | 3/2008 | Kito .................... C09D 11/101 522/26 |
| 2008/0184930 A1* | 8/2008 | Furukawa ........... B41J 11/0015 118/46 |
| 2011/0050822 A1* | 3/2011 | Fujisawa ........... B41J 11/00212 347/102 |
| 2011/0159203 A1 | 6/2011 | Loccufier et al. |
| 2014/0065378 A1 | 3/2014 | Xu |
| 2015/0017398 A1* | 1/2015 | Saito .................... C09D 11/30 428/195.1 |
| 2016/0090504 A1 | 3/2016 | Araki |
| 2017/0021641 A1* | 1/2017 | Goi ...................... C09D 11/326 |
| 2018/0037766 A1* | 2/2018 | Hirose ................ C09D 133/08 |

FOREIGN PATENT DOCUMENTS

CN 102001220 A 4/2011

OTHER PUBLICATIONS

International Search Report and Written Opinion dated Jun. 21, 2019 in PCT/US2019/025766 filed Apr. 4, 2019.
Luhai Li, "Coated lamination technology", pp. 225-226. Printing Industry Press, (Jul. 3, 2011). Relevancy statement is provided.

\* cited by examiner

*Primary Examiner* — John Zimmermann
(74) *Attorney, Agent, or Firm* — Oblon, McClelland, Maier & Neustadt, L.L.P.

(57) ABSTRACT

A method of forming an image on a substrate that involves applying a radiation curable white inkjet ink composition comprising a radiation curable anti-wrinkle agent onto a surface of the substrate, exposing the radiation curable white inkjet ink composition to UV light having a wavelength of less than 200 nm to pin the radiation curable white inkjet ink composition and form a coated substrate having an arithmetical mean surface roughness value $R_a$ of less than or equal to 2.0 micrometers and an arithmetical mean surface roughness depth $R_z$ of less than or equal to 10.0 micrometers, applying a radiation curable CMYK inkjet ink composition onto the coated substrate, and curing with electron beam radiation.

20 Claims, No Drawings

IN-LINE PRIMER PRINTING METHODS

BACKGROUND OF THE INVENTION

Field of the Invention

The present invention relates to in-line primer printing methods using radiation curable inkjet inks.

Discussion of the Background

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Image clarity and overall print quality are valuable in any printing application, but are particularly so in high-value packaging applications, prints involving text, high resolution print jobs, or special effect printing. Both the inks employed and the surface properties of the substrate play a role in determining the print quality outcome. Ink wetting, that is, the degree to which the droplets of ink spread upon the substrate surface and coalesce with neighboring droplets, as well as the adhesion properties of the ink, are a few of the fundamental characteristics of ink which can affect print quality. For example, insufficient wetting of the substrate by the ink may lead to gaps between adjacent rows of ink droplets which appear in the printed article as lines or bands running in the direction of printing. Conversely, too high a degree of wetting on the substrate may cause the ink to spread too far on the substrate surface, causing a loss of edge definition, which is especially undesirable in print jobs requiring high resolution.

SUMMARY OF THE INVENTION

Surface characteristics of the substrate are an often overlooked factor that influences the final image clarity and quality. Some substrates are not print-receptive, and have uneven surfaces, a high surface roughness, or a high porosity, for example. Obtaining high resolution, high clarity images on such substrates can be difficult due to difficulties in applying inks uniformly over the entire uneven surface. For instance, ink may be drawn down into the pores of the substrate, fail to cover the peaks and valleys of a rough surface evenly, or otherwise fail to cover the rough surface uniformly. Such inconsistent ink coverage and variable ink density across the surface can lead to a visible and measurably low-reflectivity, a low color strength, mottling, puddling, and a lack of sharp lines, undesirable color rendition, and an overall non-aesthetically pleasing image. These problems can be exacerbated by the fact that different substrates have varying surface characteristics that may react with each ink differently.

One strategy for improving substrate surface characteristics and to improve adhesion of applied inks, is to first apply a primer coating. While primer coatings can be effective, they typically require complete drying and/or curing prior to application of the image-forming inks. Drying and/or curing take time and energy to accomplish, and as a result, productivity is reduced and production costs increase. Further, the primer coating may shrink during the drying and/or curing step to an extent that diminishes the surface smoothening effect that can be realized. The prior art also fails to disclose primer formulations which would be suitable for use in packaging where organoleptic characteristics such as odor and migration are important (e.g. food, tobacco, and pharmaceutical packaging).

In view of the forgoing, there is a need for printing methods that improve the surface characteristics of non-print receptive substrates, and form sharp, clear, high quality images, while increasing printing speeds and reducing energy costs associated with in-line primer coating applications.

Accordingly, it is one object of the present invention to provide novel methods of forming an image by applying white inkjet ink compositions to a surface of the substrate, pinning with UV light to form a coated substrate with a low surface roughness, applying a CMYK inkjet ink composition and exposing the pinned white inkjet ink composition and the CMYK inkjet ink composition simultaneously to electron beam radiation.

These and other objects, which will become apparent during the following detailed description, have been achieved by the inventors' discovery that the following white inkjet ink composition employing a radiation curable anti-wrinkle agent can be pinned with UV light to provide a coated substrate with a low surface roughness that enables production of high quality prints with fast printing speeds and low energy costs.

Thus, the present invention provides:

(1) A method of forming an image on a substrate, comprising:

applying a radiation curable white inkjet ink composition comprising a radiation curable anti-wrinkle agent onto a surface of the substrate;

exposing the radiation curable white inkjet ink composition to UV light having a wavelength of less than 200 nm to pin the radiation curable white inkjet ink composition and form a coated substrate having an arithmetical mean surface roughness value $R_a$ of less than or equal to 2.0 micrometers and an arithmetical mean surface roughness depth $R_z$ of less than or equal to 10.0 micrometers;

applying a radiation curable CMYK inkjet ink composition onto the coated substrate; and exposing the pinned radiation curable white inkjet ink composition and the radiation curable CMYK inkjet ink composition to electron beam radiation.

(2) The method of (1), wherein the exposing to UV light results in partial curing of the radiation curable white inkjet ink composition.

(3) The method of (1) or (2), wherein the electron beam radiation results in complete curing of the pinned radiation curable white inkjet ink composition and the radiation curable CMYK inkjet ink composition.

(4) The method of any one of (1) to (3), wherein the radiation curable white inkjet ink composition is exposed to UV light having a wavelength of less than 175 nm.

(5) The method of any one of (1) to (4), wherein the pinned radiation curable white inkjet ink composition has a thickness of 2 to 50 micrometers.

(6) The method of any one of (1) to (5), wherein the coated substrate has an arithmetical mean surface roughness value $R_a$ of 0.5 to 1.5 micrometers.

(7) The method of any one of (1) to (6), wherein the coated substrate has an arithmetical mean surface roughness depth $R_z$ of 3.5 to 7.0 micrometers.

(8) The method of any one of (1) to (7), wherein the substrate is a plastic substrate.

(9) The method of any one of (1) to (8), wherein the radiation curable anti-wrinkle agent is a poly-ethylenically unsaturated monomer of a polyalcohol which has 3 to 9 carbon atoms.

(10) The method of any one of (1) to (9), wherein the radiation curable anti-wrinkle agent is a pentaerythritol poly-ethylenically unsaturated monomer.

(11) The method of any one of (1) to (10), wherein the radiation curable anti-wrinkle agent is a pentaerythritol poly-acrylate monomer.

(12) The method of any one of (1) to (11), wherein the radiation curable anti-wrinkle agent is a mixture of pentaerythritol poly-acrylate monomers.

(13) The method of (12), wherein the mixture of pentaerythritol poly-acrylate monomers is a mixture of pentaerythritol triacrylate monomer and pentaerythritol tetraacrylate monomer.

(14) The method of (13), wherein a weight ratio of pentaerythritol triacrylate monomer to pentaerythritol tetraacrylate monomer in the mixture is about 1:3 to 3:1.

(15) The method of any one of (1) to (14), wherein the radiation curable anti-wrinkle agent is present in an amount of about 15 to about 40 wt. %, based on a total weight of the radiation curable white inkjet ink composition.

(16) The method of any one of (1) to (15), wherein the radiation curable white inkjet ink composition further comprises a mono-ethylenically unsaturated monomer, a poly-ethylenically unsaturated component, a surfactant, and a white pigment.

(17) The method of (16), wherein the white pigment is present in the radiation curable white inkjet ink composition in an amount of about 1 to about 30 wt. %, based on a total weight of the radiation curable white inkjet ink composition.

(18) The method of any one of (1) to (17), wherein the radiation curable white inkjet ink composition is substantially free of a photoinitiator.

(19) The method of any one of (1) to (18), wherein the radiation curable CMYK inkjet ink composition is substantially free of a photoinitiator.

(20) The method of any one of (1) to (19), wherein the UV light having a wavelength of less than 200 nm is generated from an LED source.

The foregoing paragraphs have been provided by way of general introduction, and are not intended to limit the scope of the following claims. The described embodiments, together with further advantages, will be best understood by reference to the following detailed description.

DETAILED DESCRIPTION OF THE INVENTION

In the following description, it is understood that other embodiments may be utilized and structural and operational changes may be made without departure from the scope of the present embodiments disclosed herein.

The term "curable" describes, for example, an ink composition with an ability to polymerize, harden, and/or crosslink in response to a suitable curing stimulus such as actinic radiation (e.g., ultraviolet (UV) energy, infrared (IR) energy, for example from a light emitting diode (LED)), electron beam (EB) energy, heat energy, or other source of energy. A curable ink composition typically is liquid at 25° C. prior to curing. A curable ink composition can be used to print on a substrate, forming a film of printed ink or coating. The film of curable ink is cured by hardening, polymerizing and/or cross-linking the ink or coating to form a cured ink. The term "radiation curable" refers, for example, to all forms of curing upon exposure to a radiation source, including light sources (e.g., actinic radiation, such as ultraviolet (UV) light or more rarely visible light), a heat source in the presence or absence of high-temperature thermal initiators, and an accelerated particle source (e.g., electron beam (EB) radiation) in the presence or absence of initiators, and appropriate combinations thereof.

As used herein, the term "cured" refers to a curable ink composition whereby curable components present in the curable ink composition have undergone polymerization, crosslinking, and/or hardening to form a polymerized or cross-linked network, and includes both partially cured and completely cured ink compositions. When the radiation curable inkjet ink composition cures from a liquid state to a solid state, the curable monomers and/or oligomers form (1) chemical bonds, (2) mechanical bonds, or (3) a combination of a chemical and mechanical bonds. "Pinning" is a term of the art that describes sufficiently curing an ink composition to move the ink droplets to a higher viscosity state and immobilizing the ink on the underlying surface, but without completely curing the ink composition. Pinning thus results in a "partial cure" whereby less than 50 wt. %, or less than 40 wt. %, or less than 30 wt. %, or less than 20 wt. %, or less than 10 wt. %, or less than 5 wt. % of the curable functional groups present in the ink composition are polymerized and/or crosslinked, for example from 1 to 30 wt. %. As used herein, the term "complete cure" refers to a radiation curable ink composition where at least 50 wt. %, preferably at least 60 wt. %, preferably at least 70 wt. %, preferably at least 80 wt. %, more preferably at least 90 wt. %, even more preferably at least 95 wt. %, yet even more preferably at least 99 wt. % of the curable functional groups present in the starting composition undergo conversion (i.e., polymerized and/or crosslinked). The degree of curing described above may be quantified by measuring percent reacted ethylenically unsaturated groups using Fourier Transform Infrared spectroscopy (FTIR).

Suitable ethylenically unsaturated groups that may be cured in the present ink compositions include acrylate, methacrylate, acrylamide, methacrylamide, vinyl, allyl, or other ethylenically unsaturated functional groups. The materials including such groups can be in the form of monomers, oligomers, and/or polymers, or mixtures thereof. As used herein, the term "monomer" is a compound whose molecules can join together to form oligomers or polymers. "Oligomers" as used herein is a polymeric compound containing relatively few repeated structural units (i.e., 2, 3, or 4 repeat units). A "polymer" as used herein is a large molecule, or macromolecule, composed of many repeated structural units (i.e., 5 or more repeat units). Ethylenically unsaturated alkoxylated compounds are excluded from the definition of an oligomer or a polymer and are herein considered monomers unless indicated otherwise. For example, propoxylated neopentyl glycol diacrylate is considered a monomer.

As used herein, "mono-ethylenically unsaturated" refers to components (i.e., monomers or oligomers) of the radiation curable inkjet inks which have one ethylenically unsaturated group per molecule, while "poly-ethylenically unsaturated" refers to those components (monomers or oligomers) having two or more (e.g., 2, 3, 4, 5, 6, 7, 8, etc.) ethylenically unsaturated groups per molecule. For example a "mono-ethylenically unsaturated oligomer" refers to an oligomeric material containing one ethylenically unsaturated group that may participate in curing when exposed to a radiation source.

As used herein, the phrase "radiation curable inkjet inks" refers to the radiation curable white inkjet ink compositions (also referred to as "primer" coatings) and the radiation curable CMYK inkjet ink compositions, collectively, and therefore the description that follows can be applied to either the radiation curable white inkjet ink compositions, the radiation curable CMYK inkjet ink composition, or both. For example, when it is stated that the "radiation curable inkjet inks" may include a mono-ethylenically unsaturated monomer, that is to mean that the mono-ethylenically unsaturated monomer may be included in either, or both, of the radiation curable white inkjet ink compositions or the radiation curable CMYK inkjet ink composition, unless specifically stated otherwise.

When referencing radiation curable inkjet inks, the phrase "substantially free", unless otherwise specified, describes an amount of a particular component (e.g., a photoinitiator) present in the ink composition being less than about 1 wt. %, preferably less than about 0.5 wt. %, more preferably less than about 0.1 wt. %, even more preferably less than about 0.05 wt. %, yet even more preferably 0 wt. %, relative to a total weight of the radiation curable inkjet ink.

As used herein, the terms "optional" or "optionally" means that the subsequently described event(s) can or cannot occur or the subsequently described component(s) may or may not be present (e.g., 0 wt. %).

Radiation Curable Inkjet Inks

The method disclosed herein produces high quality images on a variety of substrates by utilizing a radiation curable white inkjet ink composition that forms a print-receptive surface, i.e., a surface having a suitable surface roughness, for receiving a radiation curable CMYK inkjet ink composition. These radiation curable inkjet inks comprise radiation curable materials that possess suitable physical stability, chemical stability, and low volatility at both ambient temperatures and print head operating temperatures, and after curing, provide advantageous adhesion and gloss properties, rub and scratch resistance, and low migration tendencies.

The following components may be included in the radiation curable inkjet inks: a mono-ethylenically unsaturated oligomer, a mono-ethylenically unsaturated monomer, a poly-ethylenically unsaturated component, a radiation curable anti-wrinkle agent, an acrylate ester of a carboxylic acid, an anti-kogation agent, a colorant, a surfactant, as well as an additive (e.g., a stabilizer, an adhesion promoter, and/or a security taggant).

Mono-Ethylenically Unsaturated Oligomer

Mono-ethylenically unsaturated oligomers generally provide fast curing, strong yet flexible cured films, high elongation, and chemical resistance. Both aliphatic and aromatic mono-ethylenically unsaturated oligomers may be employed herein, for example, acrylates or methacrylates of straight chain, branched chain, or cyclic alkyl alcohols, and aromatic acrylic oligomers, including polyether alcohols thereof. Specific examples include aliphatic monoacrylate oligomers (e.g., CN152, CN130), aromatic monoacrylate oligomers (e.g., CN131), acrylic oligomers (e.g., CN2285) and the like, as well as mixtures thereof. In addition to acrylate or methacrylate groups, the mono-ethylenically unsaturated oligomers employed herein may also possess hydroxyl functionality, for example CN3100 and CN3105. All of the oligomers disclosed above are available from Sartomer Co. Inc. (Exton, Pa.). Preferably, when present, the mono-ethylenically unsaturated oligomer is at least one selected from the group consisting of CN3100, CN3105, and CN131, most preferably CN3100.

The mono-ethylenically unsaturated oligomer may optionally be present in the radiation curable inkjet inks in an amount of at least about 8 wt. %, preferably at least about 10 wt. %, preferably at least about 11 wt. %, preferably at least about 12 wt. %, more preferably at least about 13 wt. %, even more preferably at least about 14 wt. %, and up to about 25 wt. %, preferably up to about 20 wt. %, preferably up to about 18 wt. %, more preferably up to about 16 wt. %, or in a range of 12 to 20 wt. %, preferably 13 to 18 wt. %, more preferably 14 to 16 wt. % based on a total weight of the radiation curable inkjet ink.

In some embodiments, the mono-ethylenically unsaturated oligomer has a number average molecular weight of at least about 250 g/mol, preferably at least about 300 g/mol, more preferably at least about 350 g/mol, and up to about 50,000 g/mol, preferably up to about 30,000 g/mol, preferably up to about 10,000 g/mol, more preferably up to about 5,000 g/mol, even more preferably up to about 1,000 g/mol. The viscosity of the mono-ethylenically unsaturated oligomer is typically from about 50 cPs, preferably from about 70 cPs, more preferable from about 90 cPs, and up to about 1,200 cPs, preferably up to about 1,100 cPs, and more preferably up to about 1,000 cPs at 25° C., although viscosities outside of this range are possible and the mono-ethylenically unsaturated oligomers may still function as intended.

Mono-Ethylenically Unsaturated Monomer

Mono-ethylenically unsaturated monomers may increase the chain length of oligomers or otherwise build molecular weight, without excessive crosslinking, contributing to low modulus, high elongation, flexibility, desirable hardness properties, thermal resistance, low shrinkage, improved water resistance, resiliency, and impact resistance of the cured ink compositions.

The mono-ethylenically unsaturated monomer may be an acrylate ester monomer having hydroxyl functionality, an aliphatic or aromatic acrylate ester monomer, and/or a vinyl ether monomer.

Suitable acrylate ester monomers having hydroxyl functionality include hydroxyl functional monoacrylates, or their mono(meth)acrylates of straight chain, branched chain, or cyclic alkyl alcohols, including polyether alcohols. Examples of which include, but are not limited to, hydroxyalkylacrylates and hydroxyalkyl(meth)acrylates wherein the hydroxyalkyl group contains 1 to 12 carbon atoms, preferably 2 to 10 carbon atoms, preferably 3 to 8 carbon atoms. Examples include hydroxyethylacrylate, hydroxyethyl(meth)acrylate, hydroxypropylacrylate, hydroxypropyl(meth)acrylate, hydroxybutylacrylate, hydroxybutyl(meth)acrylate, 2-hydroxy-3-phenyloxypropylacrylate, 2-hydroxy-3-phenyloxypropyl(meth)acrylate, 1,4-butanediol monoacrylate, 1,4-butanediol mono(meth)acrylate, 4-hydroxycyclohexylacrylate, 4-hydroxycyclohexyl(meth)acrylate, 1,6-hexanediol monoacrylate, 1,6-hexanediol mono(meth)acrylate, 2-[(1',1',1'-trifluoro-2'-(trifluoromethyl)-2'-hydroxy)propyl]-3-norbornyl methacrylate, and any combination or subset thereof.

Aliphatic or aromatic acrylate ester monomers for use in radiation curable inkjet inks include, but are not limited to, for example, acrylates and (meth)acrylates of straight chain, branched chain, or cyclic alkyl alcohols, such as alcohols having 1-20 carbon atoms, preferably 4-16 carbon atoms, including polyether alcohols thereof, as well as acrylates or (meth)acrylates of aromatic, bicyclic or heterocyclic alcohols, optionally containing an aliphatic linking group between the acrylate and the aromatic group, bicycle or heterocycle. Exemplary aliphatic mono-ethylenically unsaturated monomers include, but are not limited to, 3,3,5-trimethylcyclohexyl acrylate (e.g., SR420), 3,3,5-trimethylcyclohexyl methacrylate (e.g., CD421), 3,5,5-trimethylhexyl acrylate, cyclohexyl methacrylate, phenyl methacrylate, 4-tert-butylcyclohexyl acrylate (Laromer TBCH), dicyclopentadienyl methacrylate (e.g., CD535), diethylene glycol methyl ether methacrylate (e.g., CD545), methoxy polyethylene glycol (550) monoacrylate monomer (CD553), alkoxylated tetrahydrofurfuryl acrylate (e.g., CD611), ethoxylated (4) nonyl phenol methacrylate (e.g., CD612), ethoxylated nonyl phenol acrylate (e.g., CD613), triethylene glycol ethyl ether methacrylate (e.g., CD730), monofunctional acid ester (e.g., CD9050), alkoxylated lauryl acrylate (e.g., CD9075), alkoxylated phenol acrylate (e.g., CD9087), tetrahydrofurfuryl methacrylate (e.g., SR203), isodecyl methacrylate (e.g., SR242), 2-(2-ethoxyethoxy) ethyl acrylate (e.g., SR256), stearyl acrylate (e.g., SR257), tetrahydrofurfuryl acrylate (e.g., SR285), lauryl methacrylate (e.g., SR313A), stearyl methacrylate (e.g., SR324), lauryl acrylate (e.g., SR335), 2-phenoxyethyl acrylate (e.g., SR339), 2-phenoxyethyl methacrylate (e.g., SR340), isodecyl acrylate (e.g., SR395), isobornyl methacrylate (e.g., SR423A), isooctyl acrylate (e.g., SR440), octadecyl acrylate (SR484), tridecyl acrylate (SR489D), tridecyl methacrylate (SR493), caprolactone acrylate (e.g., SR495), ethoxylated (4) nonylphenol acrylate (e.g., SR504), isobornyl acrylate (e.g., SR506A), cyclic trimethylolpropane formal acrylate (e.g., SR531), methoxy polyethylene glycol (350) monomethacrylate (e.g., SR550), and the like. The mono-ethylenically unsaturated monomers may be used singly or in combination of two or more thereof. All of the monomers disclosed above are available from Sartomer Co. Inc. (Exton, Pa.), BASF Dispersions & Resins, North America, or Sigma Aldrich. In some embodiments, the mono-ethylenically unsaturated monomer is preferably at least one selected from the group consisting of 4-tert-butylcyclohexyl acrylate, isobornyl acrylate, 3,3,5-trimethylcyclohexyl acrylate, and 2-phenoxyethyl acrylate, most preferably 3,3,5-trimethylcyclohexyl acrylate (e.g., SR420). Other hybrid monomers include Oxetane (Meth)Acrylate Monomers such as OXE-10 Oxetane Acrylate and OXE-30 Oxetane Methacrylate manufactured by Osaka Organic Chemicals Co., Ltd.

Vinyl ether monomers may include an aliphatic, aromatic, alkoxy, aryloxy mono-functional vinyl ether and vinyl ether alcohol. Suitable examples include vinyl ethers such as Rapi-cure HBVE, Rapi-cure CVE, Rapi-cure EHVE, all available from Ashland Specialty Company, 4-hydroxymethyl cyclohexylmethyl vinyl ether (Novachem), dodecylvinyl ether, and octadecylvinylether.

The mono-ethylenically unsaturated monomer may be present in the radiation curable inkjet inks in an amount of at least about 20 wt. %, preferably at least about 24 wt. %, preferably at least about 26 wt. %, preferably at least about 28 wt. %, more preferably at least about 30 wt. %, even more preferably at least about 32 wt. %, and up to about 50 wt. %, preferably up to about 48 wt. %, preferably up to about 46 wt. %, more preferably up to about 44 wt. %, even more preferably up to about 42 wt. %, yet even more preferably up to about 40 wt. %, yet even more preferably up to about 38 wt. %, yet even more preferably up to about 36 wt. %, yet even more preferably up to about 34 wt. %, or in a range of 24 to 38 wt. %, preferably 26 to 36 wt. %, more preferably 28 to 34 wt. %, based on a total weight of the radiation curable inkjet ink.

The viscosity of the mono-ethylenically unsaturated monomer is typically from about 2 cPs, preferably from about 3 cPs, more preferable from about 5 cPs, and up to about 300 cPs, preferably up to about 200 cPs, preferably up to about 150 cPs, preferably up to about 145 cPs, and more preferably up to about 140 cPs at 25° C., although viscosities outside of this range are possible and the mono-ethylenically unsaturated monomers may still function as intended.

Poly-Ethylenically Unsaturated Component

In some embodiments, the radiation curable inkjet inks further include a poly-ethylenically unsaturated component, which includes two or more ethylenically unsaturated groups per molecule, for example di-, tri-, tetra-, penta-, hexa-, hepta-, and octa-ethylenically unsaturated molecules. Poly-ethylenically unsaturated components for use in the radiation curable inkjet inks include, for example, acrylates, (meth)acrylates, or vinyl ethers of straight chain, branched chain, hyperbranched or cyclic alkyl alcohols including those that are silicone, polyester, or glycol-based acrylates, (meth)acrylates, or vinyl ethers of alcohols. When present, the poly-ethylenically unsaturated component is separate and distinct from the anti-wrinkle agent, which will be described hereinafter, even though the radiation curable anti-wrinkle agent may meet the definition of a poly-ethylenically unsaturated component.

In some embodiments, the radiation curable inkjet inks are substantially free of poly-ethylenically unsaturated components. However, when present, the amount of poly-ethylenically unsaturated component present in the radiation curable inkjet inks is typically at least about 10 wt. %, preferably at least about 15 wt. %, preferably at least about 20 wt. %, preferably at least about 21 wt. %, more preferably at least about 22 wt. %, even more preferably at least about 23 wt. %, and up to about 40 wt. %, preferably up to about 35 wt. %, preferably up to about 30 wt. %, more preferably up to about 29 wt. %, even more preferably up to about 28 wt. %, yet even more preferably up to about 27 wt. %, yet even more preferably up to about 26 wt. %, yet even more preferably up to about 25 wt. %, or in a range of 21 to 27 wt. %, preferably 22 to 26 wt. %, more preferably 23 to 25 wt. %, based on a total weight of the radiation curable inkjet ink.

The poly-ethylenically unsaturated component may be a poly-ethylenically unsaturated monomer, a poly-ethylenically unsaturated oligomer, or a mixture thereof.

Suitable poly-ethylenically unsaturated monomers include acrylates, (meth)acrylates, and/or vinyl ethers of straight chain, branched chain, hyperbranched or cyclic alkyl alcohols having 10 or more carbon atoms, preferably 11 or more carbon atoms, preferably 12 or more carbon atoms. The number of carbon atoms mentioned here is with respect to the alcohol component from which the poly-ethylenically unsaturated component is based, that is, the carbon count does not include carbon atoms derived from the radiation curable functional groups. Poly-ethylenically unsaturated monomers are typically liquids at a temperature of 25° C., and may provide advantageous viscosity properties. Exemplary poly-ethylenically unsaturated monomers that may be employed herein include acrylates of propoxylated alcohols such as propoxylated (2) neopentyl glycol diacrylate (PONPGDA, SR9003B, Sartomer Co. Inc.), acrylates of ethoxylated alcohols such as ethoxylated (6) trimethylolpropane triacrylate (e.g., SR499, Sartomer Co. Inc.), bis[4-(ethenyloxy)butyl]hexanedioic acid ester (VECTOMER 4060), bis[4-(ethenyloxybutyl]ester of 1,3-benzenedicarboxylic acid (VECTOMER 4010), trifunctional vinyl ether monomers (e.g., tris(4-vinyloxybutyl) trimellitate, VECTOMER 5015), all available from Vertellus Performance Materials, Greensboro, N.C. Preferably, when present, acrylates of propoxylated alcohols such as propoxylated (2) neopentyl glycol diacrylate (SR9003B, Sartomer Co. Inc.) are used as the poly-ethylenically unsaturated monomer.

Poly-ethylenically unsaturated oligomers may optionally be used in the radiation curable inkjet inks to offer toughness, flexibility, abrasion resistance, exterior durability, resistance to yellowing, and other desirable properties to the cured ink compositions. In some embodiments, the poly-ethylenically unsaturated oligomers have a number average molecular weight of at least about 300 g/mol, preferably at least about 500 g/mol, more preferably at least about 800 g/mol, and to about 50,000 g/mol, preferably up to about 30,000 g/mol, more preferably up to about 10,000 g/mol, even more preferably up to about 5,000 g/mol, yet even more preferably up to about 1,200 g/mol. Exemplary poly-ethylenically unsaturated oligomers that may be employed herein include diacrylate oligomers (e.g., CN132, CN991, CN962, CN964, and CN966, Sartomer Co. Inc.), tetra-acrylate oligomers (e.g., CN549, Sartomer Co. Inc.), silicone hexa-acrylates (e.g., EBECRYL 1360, Allnex, Belgium), urethane acrylates (e.g., EBECYRL 1290, Allnex, Belgium), polyester acrylate oligomers (e.g., CN2302 and CN2303, Sartomer Co. Inc.), polyether acrylate oligomers (EBECRYL LEO 10551, which is amine modified, available from Allnex, Belgium), polyester acrylate/polyether acrylate blends (e.g., BDE1025, Dymax Corp.), polyester urethane-based oligomers (e.g., CN966J75, which is an aliphatic polyester based urethane diacrylate oligomer blended with 25 wt. % SR506, isobornyl acrylate, available from Sartomer Co. Inc.), aliphatic urethane oligomers (e.g., EBECRYL 8411, which is an aliphatic urethane diacrylate oligomer blended with 20 wt. % isobornyl acrylate, available from Allnex, Belgium, and CN9893, available from Sartomer Co. Inc.), aromatic urethane acrylates (e.g., EBECRYL 220, available from Allnex, Belgium), polyfunctional vinyl ether oligomers (e.g., VECTOMER 1312, Sigma Aldrich), silicone di-acrylates (e.g., CN9800, available from Sartomer Co. Inc., and EBECRYL 350, available from Allnex, Belgium). Most preferably, when employed herein, the poly-ethylenically unsaturated oligomer is a polyester urethane-based oligomers (e.g., CN966J75). These poly-ethylenically unsaturated oligomers may be used singly or in combination of two or more.

In preferred embodiments, the poly-ethylenically unsaturated component is at least one selected from the group consisting of propoxylated (2) neopentyl glycol diacrylate (e.g., SR9003B), ethoxylated (6) trimethylolpropane triacrylate (e.g., SR499), EBECRYL 8411, CN9893, and/or CN966J75, more preferably SR9003B and/or CN966J75.

In some embodiments, the poly-ethylenically unsaturated component is a mixture of the poly-ethylenically unsaturated monomer and the poly-ethylenically unsaturated oligomer. Under these circumstances, a weight ratio of the poly-ethylenically unsaturated monomer to the poly-ethylenically unsaturated oligomer is typically at least 2:1, preferably at least 3:1, preferably at least 4:1, more preferably at least 5:1, even more preferably at least 6:1, and up to about 10:1, preferably up to about 9:1, more preferably up to about 8:1, even more preferably up to about 7:1. However, weight ratios outside of this range are possible and the poly-ethylenically unsaturated component may still provide suitable radiation curable inkjet inks.

Radiation Curable Anti-Wrinkle Agent

The radiation curable white inkjet ink composition, and optionally the radiation curable CMYK inkjet ink composition, may include a radiation curable anti-wrinkle agent. The radiation curable anti-wrinkle agent is preferably used in the primer coat to prevent wrinkling or distortion of the ink during any subsequent pinning/curing process, thus minimizing surface roughness as will be discussed hereinafter. Further, because the anti-wrinkle agent is itself radiation curable, it can become incorporated into the polymerized/crosslinked ink component network to suppress the occurrence of migration.

The radiation curable anti-wrinkle agent may be a poly-ethylenically unsaturated monomer of a polyalcohol which has 3 to 9 carbon atoms, preferably 4 to 8 carbon atoms, preferably 5 to 7 carbon atoms. The number of carbon atoms mentioned here is with respect to the polyalcohol moiety from which the anti-wrinkle agent is based, that is, the carbon count does not include carbon atoms derived from the radiation curable functional groups. The radiation curable anti-wrinkle agent may be based on a polyalcohol having 2, 3, 4, 5, 6, 7, 8, or 9 hydroxyl groups wherein at least 2, preferably at least 3, preferably at least 4 of the hydroxyl groups are functionalized with a radiation curable group (e.g., acrylate, methacrylate, acrylamide, methacrylamide, vinyl, allyl, etc., as well as mixtures thereof), including radiation curable anti-wrinkle agents in which all of the alcohols of the polyalcohol are functionalized with radiation curable groups or in which the polyalcohol is not fully functionalized with radiation curable groups. In preferred embodiments, a ratio of a number of hydroxyl groups to carbon atoms of the polyalcohol ranges from 2:5 to 1:1, preferably 1:2 to 4:5. In some embodiments, a mixture is employed in which the polyalcohol is functionalized with a different number of radiation curable groups, for example a mixture of tri- and tetra-acrylate esters of the polyalcohol.

In some embodiments, the radiation curable anti-wrinkle agent is based on glycerol, neopentyl glycol, pentaerythritol, and/or trimethylolpropane, as well as derivatives thereof. In preferred embodiments, the radiation curable anti-wrinkle agent is based on pentaerythritol which is of the following generic structure:

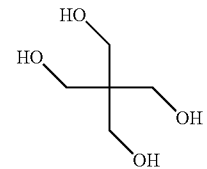

For example, the radiation curable anti-wrinkle agent may be a pentaerythritol poly-ethylenically unsaturated monomer, wherein two, three, or four of the hydroxyl groups of pentaerythritol are functionalized with a radiation curable group (e.g., acrylate, methacrylate, acrylamide, methacrylamide, vinyl, allyl, etc.). In preferred embodiments, the radiation curable anti-wrinkle agent is a pentaerythritol poly-acrylate monomer, wherein two, three, or four of the hydroxyl groups of pentaerythritol are functionalized with acrylate functional groups, including mixtures thereof, more preferably, a pentaerythritol triacrylate monomer, a pentaerythritol tetraacrylate monomer, or a mixture thereof. In most preferred embodiments, the radiation curable anti-wrinkle agent is a mixture of a pentaerythritol triacrylate monomer and a pentaerythritol tetraacrylate monomer. Any suitable weight ratio of pentaerythritol triacrylate monomer and pentaerythritol tetraacrylate monomer may be employed in the radiation curable white inkjet ink composition (and optionally the radiation curable CMYK inkjet ink composition) so long as an appropriate level of surface roughness is produced after pinning/curing. A smooth film is required for sharp print quality after application of subsequent ink. Roughness is inversely indicative of the smoothness of surface of the ink film. Typically, a weight ratio of the pentaerythritol triacrylate monomer to the pentaerythritol tetraacrylate monomer is from about 1:5, preferably from about 1:4, more preferably from about 1:3, even more preferably from about 1:2, and up to about 5:1, preferably up to about 4:1, more preferably up to about 3:1, even more preferably up to about 2:1, or about 1:1. The radiation curable anti-wrinkle agent used herein may be PETIA, available from Allnex, Belgium, which is a mixture of pentaerythritol triacrylate monomer and pentaerythritol tetraacrylate monomer (in a weight ratio of about 1:1).

The radiation curable anti-wrinkle agent may be a di-ethylenically unsaturated monomer of a polyalkylene glycol having no more than 9 carbon atoms, preferably no more than 8 carbon atoms, preferably no more than 7 carbon atoms, preferably no more than 6 carbon atoms. In preferred embodiments, the radiation curable anti-wrinkle agent is based on diethylene glycol, triethylene glycol, tetraethylene glycol, dipropylene glycol, tripropylene glycol, an ethylene-propylene glycol (where the total number of carbon atoms adds up to no more than 9), and mixtures thereof. Exemplary di-ethylenically unsaturated monomers of a polyalkylene glycols include, but are not limited to, diethylene glycol di(meth)acrylate, triethylene glycol di(meth)acrylate, tetraethylene glycol di(meth)acrylate, dipropylene glycol di(meth)acrylate, tripropylene glycol di(meth)acrylate, and ethylene-propylene glycol di(meth)acrylate (where the total number of carbon atoms of the ethylene-propylene glycol adds up to no more than 9).

The radiation curable anti-wrinkle agent may be a poly-ethylenically unsaturated monomer of an ethoxylated/propoxylated polyalcohol which has no more than 9 carbon atoms, preferably no more than 8 carbon atoms, preferably no more than 7 carbon atoms, preferably no more than 6 carbon atoms. In preferred embodiments, the radiation curable anti-wrinkle agent is based on ethoxylated (n=1 to 3) glycerol, ethoxylated (n=1 to 2) neopentyl glycol, ethoxylated (n=1 to 2) pentaerythritol, ethoxylated (n=1) trimethylolpropane, propoxylated (m=1 to 2) glycerol, propoxylated (m=1) neopentyl glycol, propoxylated (m=1) pentaerythritol, and/or propoxylated (m=1) trimethylolpropane, where n and m represent the number of moles of ethylene oxide and propylene oxide, respectively, per mole of the polyalcohol. Exemplary poly-ethylenically unsaturated monomers of ethoxylated/propoxylated polyalcohols include, but are not limited to, ethoxylated (n=1) trimethylolpropane tri(meth)acrylate, propoxylated (m=1) trimethylolpropane tri(meth)acrylate, ethoxylated (n=1 to 3) glycerol tri(meth)acrylate, propoxylated (m=1 to 2) glycerol tri(meth)acrylate, ethoxylated (n=1 to 2) pentaerythritol tri(meth)acrylate, ethoxylated (n=1 to 2) pentaerythritol tetra(meth)acrylate, propoxylated (m=1) pentaerythritol tri(meth)acrylate, and propoxylated (m=1) pentaerythritol tetra(meth)acrylate.

Other exemplary radiation curable anti-wrinkle agents include, but are not limited to, 1,3-butanediol di(meth)acrylate, 1,4-butanediol di(meth)acrylate, 1,6-hexanediol di(meth)acrylate, 1,9-nonanediol di(meth)acrylate, neopentyl glycol di(meth)acrylate, 2-hydroxy 1,3-methacryloxy propane, triethyleneglycol divinylether (e.g., Rapi-cure DVE 3), cyclohexanedimethanol divinylether, diethyleneglycol divinylether, hexanediol divinylether, butanediol divinylether (all available from Sigma-Aldrich), as well as hybrid monomers containing both acrylate and vinyl ether functionality, for example 2-(2-vinyloxyethoxy)-2-propyl (meth)acrylate, 2-(2-vinyloxyethoxy)-3-propyl (meth)acrylate, 2-(2-vinyloxyethoxy)-2-butyl (meth)acrylate, 2-(2-vinyloxyethoxy) 4-butyl (meth)acrylate, 2-(2-allyloxyethoxy) ethyl (meth)acrylate, 2-(2-allyloxyethoxy)-2-propyl (meth)acrylate, 2-(2-allyloxyethoxy)-3-propyl (meth)acrylate, 2-(2-allyloxyethoxy)-2-butyl (meth)acrylate, 2-(2-allyloxyethoxy)-4-butyl (meth)acrylate, 2-(2-vinyloxypropoxy)ethyl (meth)acrylate, 2-(2-vinyloxypropoxy)-2-propyl (meth)acrylate, 2-(2-vinyloxypropoxy)-3-propyl (meth)acrylate, 2-(3-vinyloxypropoxy)ethyl (meth)acrylate, 2-(3-vinyloxypropoxy) 2-propyl (meth)acrylate, 2-(3-vinyloxypropoxy)-3-propyl(meth)acrylate, and any combinations or subset thereof. Any of the above radiation curable anti-wrinkle agents may be used singly or in combination of two or more.

The radiation curable anti-wrinkle agent may be present in the radiation curable white inkjet ink composition (and optionally in the radiation curable CMYK inkjet ink composition) in an amount of at least about 5 wt. %, preferably at least about 10 wt. %, preferably at least about 15 wt. %, preferably at least about 18 wt. %, more preferably at least about 20 wt. %, even more preferably at least about 22 wt. %, even more preferably at least about 24 wt. %, yet even more preferably at least about 26 wt. %, and up to about 40 wt. %, preferably up to about 36 wt. %, preferably up to about 34 wt. %, more preferably up to about 32 wt. %, even more preferably up to about 30 wt. %, or in a range of 5 to 40 wt. %, preferably 10 to 40 wt. %, more preferably 15 to 40 wt. %, even more preferably 18 to 36 wt. %, yet even more preferably 20 to 34 wt. %, based on a total weight of the radiation curable white inkjet ink composition (or the radiation curable CMYK inkjet ink composition when included therein).

While these amounts may be varied, in order to pin the radiation curable white inkjet ink composition, typically at least 5 wt. %, preferably at least 10 wt. %, more preferably at least 15 wt. % of the radiation curable anti-wrinkle agent is utilized, with lesser amounts providing insufficient pinning. Moreover, even though at least 5 wt. % of the radiation curable anti-wrinkle agent is capable of producing at least some degree of surface smoothening after pinning, the most advantageous surface roughness results have been found to be produced from employing at least 15 wt. %, preferably at least about 20 wt. %, more preferably at least about 22 wt. %, even more preferably at least about 24 wt. % of the radiation curable anti-wrinkle agent in the primer coating, with lesser amounts providing insufficient surface smoothening (i.e., a high surface roughness) after pinning/curing.

Although the radiation curable anti-wrinkle agent may satisfy the definition of a poly-ethylenically unsaturated component (in particular, a poly-ethylenically unsaturated monomer), these are considered herein to be separate and distinct components because, unexpectedly, the poly-ethylenically unsaturated compounds disclosed herein may not provide an anti-wrinkle effect or an anti-wrinkle effect to the same degree as the radiation curable anti-wrinkle agent (e.g., pentaerythritol poly-acrylate), despite possibly having the same number or a similar number of radiation curable functional groups and a propensity for cross-linking.

Acrylate Ester of a Carboxylic Acid Ester

In some embodiments, the radiation curable inkjet inks further include an acrylate ester of a carboxylic acid ester, which are compounds of the general formula (I)

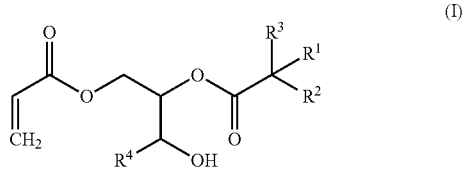

wherein $R^1$, $R^2$, and $R^3$ are each independently an alkyl, an aryl, an alkylaryl, an alkoxyaryl, or a cycloaliphatic group having 1 to 12 carbon atoms, preferably 1 to 10 carbon atoms, preferably 1 to 8 carbon atoms, preferably 2 to 6 carbon atoms.

The term "alkyl", as used herein, unless otherwise specified, refers to a saturated straight or branched, primary, secondary, or tertiary hydrocarbon and specifically includes methyl, ethyl, propyl, isopropyl, butyl, isobutyl, sec-butyl, t-butyl, pentyl, isopentyl, neopentyl, hexyl, isohexyl, 3-methylpentyl, 3-methylbutyl, 1,3-dimethylbutyl, 2,2-dimethylbutyl, and 2,3-dimethylbutyl.

The term "aryl" refers to a carbocyclic aromatic monocyclic group containing 6 carbon atoms which may be further fused to a second 5- or 6-membered carbocyclic group which may be aromatic, saturated or unsaturated. Exemplary aryl groups include, but are not limited to, phenyl, indanyl, 1-naphthyl, 2-naphthyl and tetrahydronaphthyl. "Alkylaryl" or "alkoxyaryl" refers to aryl groups which are substituted with one or more alkyl groups or alkoxy groups, respectively, as defined above.

The term "cycloaliphatic" refers to cyclized alkyl groups having 3-12 carbon atoms (i.e., C3, C4, C5, C7, C8, C9, C10, C11, and C12 cycloaliphatic groups). Exemplary cycloaliphatic groups include, but are not limited to, cyclopropyl, cyclobutyl, cyclopentyl, cyclohexyl, norbornyl and adamantyl. Branched cycloaliphatic groups having alkyl substituents, such as 1-methylcyclopropyl and 2-methylcyclopropyl, are included in the definition of "cycloaliphatic".

$R^4$ is a group selected from hydrogen, methyl, ethyl, propyl, butyl, pentyl, hexyl, heptyl, octyl, nonyl, decyl, phenyl, and alkoxy phenyl. In preferred embodiments, $R^4$ is hydrogen.

Although satisfying the definition of a mono-ethylenically unsaturated monomer, when present, the acrylate ester of a carboxylic acid ester is considered to be a separate and distinct component employed in the radiation curable inkjet inks of the present disclosure.

The "carboxylic acid ester" moiety in formula (I) is represented by general formula (II)

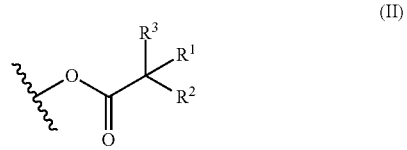

Representative examples of acids from which the carboxylic acid ester moiety can be derived include α,α-dimethyl-caproic acid, α-ethyl-α-methyl-caproic acid, α,α-diethyl-caproic acid, α,α-diethyl-valeric acid, α,α-dimethyl-capric acid, α-butyl-α-ethyl-capric acid, α,α-dimethyl-enanthic acid, α,α-diethyl-pelargonic acid, α-butyl-α-methyl-caproic acid, α,α-dimethyl-caprylic acid, α-methyl-α-propyl-caproic acid, α-ethyl-α-methyl-enanthic acid, α-methyl-α-propyl valeric acid, α-ethyl-α-methyl-caprylic acid, α-butyl-α-methyl-caprylic acid, α-ethyl-α-propyl-caproic acid, α-ethyl-α-propyl-valeric acid, α-butyl-α-ethyl-pelargonic acid, α,α-dimethyl propionic acid (pivalic acid), neodecanoic acid, which includes one or mixtures of 2,2,3,5-tetramethylhexanoic acid, 2,4-dimethyl-2-isopropylpentanoic acid, 2,5-dimethyl-2-ethylhexanoic acid, 2,2-dimethyloctanoic acid, and 2,2-diethylhexanoic acid, and combinations as well as any subset thereof. Preferred examples of acrylate esters of carboxylic acid esters include but are not limited to acrylate esters of glycidyl esters of neodecanoic acid or acrylate ester of glycidyl ester of pivalic acid and combinations thereof. In preferred embodiments, $R^1$ and $R^2$ combined have a total of 2 to 9 carbon atoms, preferably 4 to 8 carbon atoms, more preferably 6 to 8 carbon atoms, even more preferably 7 carbon atoms, while $R^3$ is methyl, and $R^4$ is hydrogen, for example ACE™ hydroxyl acrylate monomer available from Momentive (Columbus, Ohio).

In some embodiments, the radiation curable inkjet inks are substantially free of the acrylate ester of a carboxylic acid ester of formula (I). However, when present, the acrylate ester of a carboxylic acid ester of formula (I) may provide various advantageous properties to the radiation curable inkjet inks. For example, the hydroxyl group may aid adhesion to a variety of substrates, while groups $R^1$-$R^4$ may provide hydrophobicity and increased molecular weight, which generally improves migration suppression of the cured ink composition from various substrates. The acrylate ester of a carboxylic acid ester of formula (I) may optionally be present in the radiation curable inkjet inks in an amount of at least about 1 wt. %, preferably at least about 2 wt. %, preferably at least about 3 wt. %, more preferably at least about 4 wt. %, and up to about 20 wt. %, preferably up to about 15 wt. %, preferably up to about 10 wt. %, more preferably up to about 8 wt. %, even more preferably up to about 7 wt. %, yet even more preferably up to about 6 wt. %, or in a range of 2 to 8 wt. %, preferably 3 to 7 wt. %, more preferably 4 to 6 wt. % based on a total weight of the radiation curable inkjet ink.

The viscosity of the acrylate ester of a carboxylic acid ester is typically less than about 300 cPs, preferably less than about 250 cPs, preferably less than about 200 cPs, preferably up to about 150 cPs at 25° C., although viscosities outside of this range are possible and the acrylate ester of a carboxylic acid ester component may still function as intended.

Anti-Kogation Agents

In inkjet printing, repeated firings of resistor elements, which are designed to withstand millions of firings over the life of the print cartridge, result in fouling of the resistor elements with residue and degradation of performance. This build-up of residue is known as kogation. The term "kogation" thus refers to the buildup of the residue, or koga, on a surface of the resistor element in the inkjet pen. "Anti-kogation agents" thus help reduce kogation phenomenon and clogging phenomenon that can happen in internal ink channels, in firing chambers or in nozzles within the inkjet equipment. While not always present in the inks disclosed herein, in some embodiments, the radiation curable inkjet inks may include an anti-kogation agent. In general, the anti-kogation agent may optionally be employed in amounts of up to about 10 wt. %, preferably up to about 5 wt. %, preferably up to about 3 wt. %, preferably up to about 2 wt. %, preferably up to about 1 wt. %, preferably up to about 0.5 wt. %, preferably up to about 0.1 wt. %, relative to the total weight of the radiation curable inkjet inks.

The anti-kogation agent may be a phosphate or a phosphate ester, for example, phosphate esters of a fatty alcohol or an alkoxylated fatty alcohol (including mono- and/or di-esters), including salts thereof. Examples of which include ethoxylated mono-oleyl phosphate ester, oleth-3-phosphate, oleth-10 phosphate, oleth-5 phosphate, dioleyl phosphate, a nonylphenol ethoxylate phosphate ester, nonylphenol ethoxylate phosphate ester, an aliphatic phosphate ester, a phosphated nonylphenoxy polyethoxy ethanol, ethyl-hexanol ethoxylated phosphate ester (2EH-2EO), ppg-5-ceteth-10 phosphate, C9-C15 alkyl monophosphate, deceth-4 phosphate, as well as mixtures thereof. The anti-kogation agent may also be an organo-phosphonic acid or a salt thereof, for example, hydroxyethylene di (phosphonic acid) (HEDP), amino tri (methylene phosphonic acid) (ATMP), ethylene diamine tetra (methylene phosphonic acid) (EDTMP), hexamethylene diamine tetra (methylene phosphonic acid) (HDTMP), diethylene triamine penta (methylene phosphonic acid) (DTPMP), and the like, as well as mixtures thereof. In preferred embodiments, the anti-kogation agent is ethylene diamine tetra(methylene phosphonic acid) (EDTMP).

Colorants

In some embodiments, the radiation curable inkjet inks are substantially free of colorants, wherein a colorless coating composition is formed that may be useful in clear-coating applications. All of the disclosure set forth herein relating to the radiation curable inkjet inks, other than the colorant descriptions, is equally applicable to such colorless coating compositions.

The radiation curable inkjet inks may contain a colorant which may comprise pigment, dye, or a combination of pigments and/or dyes to provide the desired color. For example, in some embodiments, the radiation curable white inkjet ink composition includes a white pigment for producing a white color, while the radiation curable CMYK inkjet ink composition includes a CMYK colorant to provide colored inks having a cyan, magenta, yellow, and/or key (black) ("CMYK") color. It should be readily appreciated that various shades of white exist, including for example, but not limited to, pure white, eggshell, cream, ivory, and the like, and the white color associated with the radiation curable white inkjet ink composition herein is not limited to one particular shade of white. Likewise, while "CMYK" preferably refers to cyan, magenta, yellow, and key (black), it is to be readily appreciated by those of ordinary skill in the art that any non-white colorant may be included in the radiation curable CMYK inkjet inks to provide colored inks that may be used for forming a desired image, and thus the radiation curable CMYK inkjet inks are not limited to only cyan, magenta, yellow, and key (black). For example, a CMYK colorant used in the radiation curable CMYK inkjet inks herein may produce any non-white color, including, but not limited to, cyan, magenta, yellow, black, orange, red, blue, green, light cyan, light magenta, light yellow, light black violet, and the like, including both spot colors and process colors. The colorants can be used in combination with conventional ink-colorant materials such as Color Index (C.I.) solvent dyes, disperse dyes, modified acid and direct dyes, basic dyes, sulfur dyes, vat dyes, and the like.

In general, the colorants may be employed in amounts of up to about 45 wt. %, preferably up to about 40 wt. %, preferably up to about 36 wt. %, preferably up to about 32 wt. %, preferably up to about 30 wt. %, preferably up to about 28 wt. %, preferably up to about 24 wt. %, preferably up to about 22 wt. %, preferably up to about 20 wt. %, preferably up to about 15 wt. %, preferably up to about 10 wt. % relative to the total weight of the radiation curable inkjet inks. For example, white pigments may be employed in the radiation curable white inkjet ink compositions in amounts of 1 to 30 wt. %, relative to the total weight of the radiation curable white inkjet ink compositions, and CMYK colorants may be employed in the radiation curable CMYK inkjet ink compositions in amounts of 0.1 to 10 wt. %, relative to the total weight of the radiation curable CMYK inkjet ink compositions.

Examples of suitable dyes that can be included in the radiation curable CMYK inkjet ink compositions include Neozapon Red 492 (Pylam Products Co., Inc.); Orasol Red G (BASF); Direct Brilliant Pink B (Zibo Hongwei Industry Co.); Direct Red 3BL (Classic Dyestuffs); Supranol Brilliant Red 3BW (Bayer AG); Lemon Yellow 6G (United Chemie); Light Fast Yellow 3G (Shaanxi); Aizen Spilon Yellow C-GNH (Hodogaya Chemical); Bernachrome Yellow GD Sub (Classic Dyestuffs); Cartasol Brilliant Yellow 4GF (Clariant); Orasol Black CN (BASF); Savinyl Black RLSN (Clariant); Pyrazol Black BG (Clariant); Morfast Black 101 (Keystone); Orasol Blue GN (BASF); Savinyl Blue GLS (Clariant); Luxol Fast Blue MBSN (ACROS); Sevron Blue 5GMF (Classic Dyestuffs); Basacid Blue 750 (BASF), Neozapon BlackX51 (BASF), Classic Solvent Black 7 (Classic Dyestuffs), Sudan Blue 670 (C.I. 61554) (BASF), Sudan Yellow 146 (C.I. 12700) (BASF), SudanRed462 (C.I. 26050) (BASF), C.I. Disperse Yellow 238, Neptune Red Base NB543 (BASF, C.I. Solvent Red 49), Neopen Blue FF-4012 from BASF, Lampronol Black BR from ICI (C.I. Solvent Black 35), Morton Morplas Magenta 36 (C.I. Solvent Red 172), metal phthalocyanine colorants such as those disclosed in U.S. Pat. No. 6,221,137, which is incorporated herein by reference in its entirety, and the like. Polymeric dyes can also be used, such as those disclosed in, for example, U.S. Pat. Nos. 5,621,022 and 5,231,135, which are each incorporated herein by reference in its entirety, and commercially available from, for example, Milliken & Company as Milliken Ink Yellow 869, Milliken Ink Blue 92, Milliken Ink Red 357, Milliken Ink Yellow 1800, Milliken Ink Black 8915-67, uncut Reactant Orange X-38, uncut Reactant Blue X-17, Solvent Yellow 162, Acid Red 52, Solvent Blue 44, and uncut Reactant Violet X-80.

Also suitable are the colorants disclosed in U.S. Pat. Nos. 6,472,523, 6,726,755, 6,476,219, 6,576,747, 6,713,614, 6,663,703, 6,755,902, 6,590,082, 6,696,552, 6,576,748, 6,646,111, 6,673,139, 6,958,406, 6,821,327, 7,053,227, 7,381,831 and 7,427,323, which are each incorporated herein by reference in their entirety.

When the colorant is a pigment, the pigments generally are of a size that can be jetted from a printhead without substantially clogging print nozzles, capillaries, or other components of print equipment. Pigment size can also have an effect on the final ink viscosity. The average particle size of the pigment is generally at least about 50 nm, and less than about 750 nm, preferably less than about 500 nm, and more preferably less than about 350 nm. For example, the pigments can have a D50 of less than or equal to 350 nm. Laser diffraction methods may be used to measure the average particle size. Alternatively scanning electron microscopy may be used.

Pigments suitable for the radiation curable CMYK inkjet ink composition include, but are not limited to, those having the following Color Index classifications: Green PG 7 and 36; Orange PO 5, 34, 36, 38, 43, 51, 60, 62, 64, 66, 67 and 73; Red PR112, 122, 146, 149, 150, 170, 178, 179, 185, 187, 188, 207, 208, 214, 220, 224, 242, 251, 254, 255, 260 and 264; Magenta/Violet PV 19, 23, 31, and 37, and PR 122, 181 and 202; Yellow PY 12, 13, 17, 120, 138, 139, 155, 151, 168, 175, 179, 180, 181 and 185; Blue PB 15, 15:3, 15:4, 15:6; Black PB 2, 5 and 7; carbon black; zinc sulfide, and the like. Examples of suitable pigments include PALIOGEN Violet 5100 (commercially available from BASF); PALIOGEN Violet 5890 (commercially available from BASF); HELIOGEN Green L8730 (commercially available from BASF); Irgalite Scarlet D3700 (commercially available from BASF); SUNFAST Blue 15:4 (commercially available from Sun Chemical); Hostaperm Blue B2G-D (commercially available from Clariant); Hostaperm Blue B4G (commercially available from Clariant); Permanent Red P-F7RK; Hostaperm Violet BL (commercially available from Clariant); LITHOL Scarlet 4440 (commercially available from BASF); Bon Red C (commercially available from Dominion Color Company); PALIOGEN Red 3871 K (commercially available from BASF); SUNFAST Blue 15:3 (commercially available from Sun Chemical); PALIOGEN Red 3340 (commercially available from BASF); SUNFAST Carbazole Violet 23 (commercially available from Sun Chemical); LITHOL Fast Scarlet L4300 (commercially available from BASF); SUNBRITE Yellow 17 (commercially available from Sun Chemical); HELIOGEN Blue L6900, L7020 (commercially available from BASF); SUNBRITE Yellow 74 (commercially available from Sun Chemical); SPECTRA PAC C Orange 16 (commercially available from Sun Chemical); HELIOGEN Blue K6902, K6910 (commercially available from BASF); SUNFAST Magenta 122 (commercially available from Sun Chemical); HELIOGEN Blue D6840, D7080 (commercially available from BASF); Sudan Blue OS (commercially available from BASF); NEOPEN Blue FF4012 (commercially available from BASF); PV Fast Blue B2GO 1 (commercially available from Clariant); IRGALITE Blue BCA, GLSM, or GLVO (commercially available from BASF); PALIOGEN Blue 6470 (commercially available from BASF); MONASTRAL BLUE FGX, GBX, GLX, a 6Y, Sudan Orange G (commercially available from Aldrich), Sudan Orange 220 (commercially available from BASF); PALIOGEN Orange 3040 (BASF); PALIOGEN Yellow 152, 1560 (commercially available from BASF); LITHOL Fast Yellow 0991 K (commercially available from BASF); PALIOTOL Yellow 1840 (commercially available from BASF); NOVO PERM Yellow FGL (commercially available from Clariant); Ink Jet Yellow 4G VP2532 (commercially available from Clariant); Toner Yellow HG (commercially available from Clariant); Lumogen Yellow D0790 (commercially available from BASF); Suco-Yellow L1250 (commercially available from BASF); Suco-Yellow D1355 (commercially available from BASF); Suco Fast Yellow DI 355, DI 351 (commercially available from BASF); HOSTAPERM Pink E 02 (commercially available from Clariant); Hansa Brilliant Yellow 5GX03 (commercially available from Clariant); Permanent Yellow GRL 02 (commercially available from Clariant); Permanent Rubine L6B 05 (commercially available from Clariant); FANAL Pink D4830 (commercially available from BASF); CINQUASIA Magenta (commercially available from BASF); PALIOGEN Black L0084 (commercially available from BASF); Pigment Black K801 (commercially available from BASF); and carbon blacks such as REGAL 330 (commercially available from Cabot), NIPEX 150, NIPEX 160, NIPEX 180 (commercially available from Orion Engineered Carbons), SPECIAL BLACK 100, SPECIAL BLACK 250, SPECIAL BLACK 350, FW1, FW2 FW200, FW18, SPECIAL BLACK 4, SPECIAL BLACK 5, SPECIAL BLACK 6, PRINTEX 80, PRINTEX 90, PRINTEX 140, PRINTEX 150T, PRINTEX 200, PRINTEX U, and PRINTEX V, all available from Orion Engineered Carbons, MOGUL L, REGAL 400R, REGAL 330, and MONARCH 900, available from Cabot Chemical Co., Boston, Mass., MA77, MA7, MA8, MA11, MA100, MA100R, MA100S, MA230, MA220, MA200RB, MA14, #2700B, #2650, #2600, #2450B, #2400B, #2350, #2300, #2200B, #1000, #970, #3030B, and #3230B, all available from Mitsubishi, Tokyo, Japan, RAVEN 2500 ULTRA, from Birla Carbon—Columbian, and the like, as well as mixtures thereof.

White pigments suitable for use in the radiation curable white inkjet ink compositions include pigment white 1 (lead hydroxide carbonate), pigment white 3 (Lead sulfate), pigment white 4 (zinc oxide), pigment white 5 (lithopone), pigment white 6 (titanium dioxide), pigment white 7 (zinc sulfide), pigment white 10 (barium carbonate), pigment white 11 (antimony trioxide), pigment white 12 (zirconium oxide), pigment white 14 (Bismuth oxychloride), pigment white 17 (bismuth subnitrate), pigment white 18 (calcium carbonate), pigment white 19 (kaolin), pigment white 21 (barium sulfate), pigment white 24 (aluminum hydroxide), pigment white 25 (calcium sulfate), pigment white 27 (silicon dioxide), pigment white 28 (calcium metasilicate), and pigment white 32 (zinc phosphate cement). In the case of titanium oxide pigments, nanostructured titania powders from Nanophase Technologies Corporation, Burr Ridge, Ill., or under the trade names KRONOS 1171 from Kronos Titan, Cranbury, N.J may be used, including all crystalline forms such as anatase phase, rutile phase and brookite phase. Surface treated or surface coated titania, for example titania coated with silica, alumina, alumina-silica, boric acid, and zirconia, may also be used. This type of coated titanium oxide is commercially available from E.I. du Pont de Nemours and Company, Wilmington, Del., under the trade name TR52, R700, R706, R796, R900, R902, and R960. Preferably, the white pigment employed in the radiation curable white inkjet ink composition has a refractive index greater than 1.6, preferably greater than 2.0, more preferably greater than 2.5, even more preferably greater than 2.6. In preferred embodiments, the radiation curable white inkjet ink composition includes XU516, which is a white pigment dispersion in Neopentyl glycol propoxylate (1 PO/OH) diacrylate, available from Kao Collins.

Surfactants

A surfactant may generally be used to lower the surface tension of the radiation curable inkjet inks to aid wetting and leveling of the substrate surface, if necessary, before curing. While the use of surfactants may help provide advantageous ink flowability and aid leveling of the substrate surface, the use of surfactants alone does not produce the desired surface smoothening (i.e., low surface roughness) effect in the absence of the radiation curable anti-wrinkle agent.

The surfactant can be selected by both its hydrophobic and hydrophilic properties. In some embodiments, the surfactants may be miscible with the radiation curable material (i.e., acrylate or methacrylate miscible). Surfactants suitable for use in the radiation curable inkjet inks include, but are not limited to, polysiloxanes, polyacrylates, polyacrylic copolymers, fluorine containing polymers, and the like. These surfactants may include one or more functional group such as carbinol, alkyl, aryl, glycol, polyether, siloxane, and mixtures thereof. In some embodiments, these materials contain reactive groups that allow them to become part of the cured network. Suitable surfactants may include, but are not limited to polydimethylsiloxane copolymer (Siltech C-20, C-42, C-468), alkyl and aryl modified polydimethylsiloxane (Siltech C-32), silicone polyether (Siltech C-101, 442), block copolymer of dimethylsiloxane and a polyoxyalkylene (Siltech C-241, available from Siltech Corporation), Rad 2100, Rad 2200, Rad 2250, Rad 2300, Rad 2500, Rad 2600, and Rad 2700 commercially available from Evonik Industries AG; CoatOSil 1211, CoatOSil 1301, CoatOSil 3500, CoatOSil 3503, CoatOSil 3509, and CoatOSil 3573 commercially available from Momentive; Byk-381, Byk-333, Byk-361N, Byk-377, Byk-UV 3500, Byk-UV 3510, and Byk-UV 3530 commercially available from Byk Chemie; and FC-4430 and FC-4432 commercially available from 3M Corporation, and the like, and mixtures thereof. Preferably, the surfactant is Byk-361N, which is a polyacrylate-based surfactant.

The inclusion of a surfactant is optional, but when included, is used in an amount of from about 0.001 wt. %, more preferably from about 0.005 wt. %, even more preferably from 0.1 wt. %, yet even more preferably from about 1 wt. %, and up to about 10 wt. %, preferably up to 5 wt. %, preferably up to about 4 wt. %, more preferably up to about 3 wt. %, even more preferably up to about 2 wt. %, based on the total weight of the radiation curable inkjet ink.

Additives

In some embodiments, the radiation curable inkjet inks also contain at least one additive selected from the group consisting of a stabilizer, an adhesion promoter, and a security taggant.

Stabilizer

The radiation curable inkjet inks of the present disclosure may also optionally include a stabilizer to aid aerobic and/or anaerobic stability. Examples include but are not limited to Irgastab UV 10, Irgastab UV 22, Irganox 1010, Irganox 1035, and Tinuvin 292 (available from BASF), Omnistab LS292 (available from IGM Resins, Shanghai, China), 4-methoxyphenol, HQ (hydroquinone), MeHQ (methylhydroquinone), and BHT (butylated hydroxyl toluene) commercially available from Sigma-Aldrich Corp. Other types of stabilizers, such as ultraviolet light absorbing ("UVA") materials and hindered amine light stabilizers ("HALS") can be included in the radiation curable inkjet inks to provide photolytic stability to the ink, improve the weatherability of the cured ink compositions, and to provide color retention through the lifetime of the cured ink composition. Exemplary UVAs which can be employed herein include, but are not limited to, Tinuvin 384-2, Tinuvin 1130, Tinuvin 405, Tinuvin 41 IL, Tinuvin 171, Tinuvin 400, Tinuvin 928, Tinuvin 99, combinations thereof, and the like. Examples of suitable HALS include, but are not limited to, Tinuvin 123, Tinuvin 292, Tinuvin 144, Tinuvin 152, combinations thereof, and the like. Combination materials having both UVA and HALS may also be used in the radiation curable inkjet inks, such as Tinuvin 5055, Tinuvin 5050, Tinuvin 5060, Tinuvin 5151, and the like. All Tinuvin products are commercially available from BASF.

Thermal stabilizers such as hindered phenols, including sulfur-containing phenols and/or bis-hindered phenols, may optionally be used as an additive in the radiation curable inkjet inks. Exemplary thermal stabilizers include, but are not limited to, Irganox 1035 (thiodiethylene bis(3,5-di-tert-butyl)-4-hydroxyhydrocinnamate) and Irganox 1076, which are commercially available from BASF.

The stabilizers can be present in the radiation curable inkjet inks in an amount of about 0 to about 10 wt. %, preferably from about 0.001 wt. %, preferably from about 0.01 wt. %, more preferably from about 0.1 wt. %, and up to about 10 wt. %, preferably up to about 5 wt. %, preferably up to about 3 wt. %, more preferably up to about 2 wt. %, even more preferably up to about 1 wt. %, yet even more preferably up to about 0.3 wt. %, based on the total weight of the radiation curable inkjet ink.

Adhesion Promoter

The radiation curable inkjet ink may optionally include one or more adhesion promoters. In some instances, the adhesion promoter contains one or more acrylate groups. The adhesion promoter can be an amine modified adhesion promoter. Exemplary amine modified adhesion promoters include amine modified polyether acrylate oligomer (e.g., Laromer PO 94 F (BASF Corp.), amine modified polyester acrylate (e.g., EBECRYL 80, EBECRYL 81, available from Allnex, Belgium), and amine modified epoxy acrylate. The adhesion promoter may be a polyurethane, for example polyurethanes sold by Henry Company under the trade names PERMAX 20, PERMAX 200, PERMAX 100, PERMAX 120, and SANCURE 20025, or SANCURE commercially available from Lubrizol.

Generally, if present, the amount of adhesion promoter is from about 0.05 wt. %, preferably from about 1 wt. %, more preferably from about 3 wt. %, and up to about 15 wt. %, preferably up to about 10 wt. %, more preferably up to about 5 wt. %. based on the weight of the radiation curable inkjet ink.

Security Taggant

To prevent counterfeiting or unauthorized photocopying, the radiation curable inkjet inks may optionally include a security taggant. When used, the security taggants are generally employed with loadings of up to about 20 wt. %, preferably up to about 15 wt. %, preferably up to about 10 wt. %, preferably up to about 5 wt. %, preferably up to about 4 wt. %, preferably up to about 3 wt. %, preferably up to about 2 wt. %, preferably up to about 1 wt. %, preferably up to about 0.5 wt. %, relative to the total weight of the radiation curable inkjet inks. Although the amount of the security taggant is generally within this range, the amount of security taggant can be varied outside of these ranges depending on the mode of detection, for example more security taggant may be required for easy detection by the naked eye. On the other hand, if detection is done via a machine read then lower loadings may be used. The security taggants preferably have a particle size of less than 5 µm, preferably less than 1 µm, preferably less than 0.9 µm, preferably less than 0.8 µm, preferably less than 0.7 µm, preferably less than 0.5 µm, or in a range of about 0.01 to 1 µm, preferably 0.1 to 0.5 µm.

Exemplary security taggants that can be used herein include: naked rare earth (RE) sulfide fused quantum dot, and its glass encapsulated counterparts; naked RE-yttrium co-doped sulfide quantum dot, and their glass encapsulated counterparts; glass encapsulated RE oxide nanocomposite; glass encapsulated RE fluoride nanocomposite; glass encapsulated RE chloride nanocomposite; RE-yttrium co-doped hydroxycarbonate fused quantum dot; holmium doped yttria ceramic; glass encapsulated RE orthophosphates, including holmium orthophosphate ($HoPO_4$) and neodymium orthophosphate ($NdPO_4$) (also referred to as 'holmium phosphate' and 'neodymium phosphate'); naked RE orthophosphates, including holmium phosphate ($HoPO_4$) and neodymium orthophosphate ($NdPO_4$) (also referred to as 'holmium phosphate' and 'neodymium phosphate') as described in US2008/0274028 A1, which is incorporated herein by reference in its entirety. Other useful security taggants include benzothiazoles, rare earth ion chelates such as Eu trifluoroacetate trihydrate, benzoxazins, and benzimidazoles, as described in US2005/0031838 A1, which is incorporated herein by reference in its entirety.

In preferred embodiments, the radiation curable white inkjet ink composition is substantially free of a photoinitiator, more preferably is completely free of a photoinitiator (e.g., 0 wt. %). In other preferred embodiments, the radiation curable CMYK inkjet ink composition is substantially free of a photoinitiator, more preferably is completely free of a photoinitiator (e.g., 0 wt. %). Optionally, a photoinitiator may be present in the radiation curable inkjet inks. The photoinitiator may be a cationic photoinitiator, for example in applications that involve printing on substrates where adhesion is difficult, for example glass substrates. The photoinitiator may also be a free-radical photoinitiator. When present, the radiation curable inkjet inks may contain less than about 3 wt. %, preferably less than about 2 wt. %, preferably less than about 1 wt. %, preferably less than about 0.5 wt. % of the photoinitiator.

Suitable photocationic initiators that may be optionally included in the radiation curable inkjet inks include onium salts, for example, triarylsulfonium salts or diaryl iodonium salts, such as UVI-6974, UVI-6976, UVI-6990 and UVI 6992 (available from the Dow Chemical Company, Midland, Mich.), ADEKA Optomers SP-150, SP-151, SP-170, and SP-171 (Asahi Denka Kogyo, Tokyo, Japan), Omnicat 550, Omnicat 650, Omnicat BL550, Omnicat 440, Omnicat 445, Omnicat 432, Omnicat 430, Omnicat 750, Omnicat 250 (available from IGM resins, Shanghai, China), and DTS-102, DTS-103, NAT-103, NDS-103, TPS-103, MDS-103, MPI-103, BBI-103 (available from Midori Kagaku, Tokyo, Japan), Chivacure 1176, Chivacure 1190, R-gen BF 1172, R-gen 1130, R-gen 261 (available from Chitec Technology Co. Ltd.) Uvacure 1600 (available from Allnex), including combinations and sub-sets thereof. Further, in embodiments where a photocationic initiator is present, the radiation curable inkjet inks may also optionally include poly-functional alcohol components such as hexafunctional alcohol BOLTORN H 2004 (available from Perstorp Specialty Chemicals, Toledo, Ohio) to provide improved flexibility and reactivity, chemical resistance, rheological behavior, and ink transfer at high speeds.

Additionally, a photosensitizer may optionally be used, for example, to increase the efficiency of curing by the photocationic initiator. Exemplary photosensitizers include, but are not limited to, Anthracure UVS 1101 (9,10-diethoxy-anthracene) and Anthracure UVS1331 (9,10-dibutoxy anthracene) made by Kawasaki Kasei, Japan, SpeedCure CPTX (1-chloro-4-propoxythioxanthone), made by Lambson, Ltd, U.K., Genocure ITX (Isopropyl thioxanthone) and Genocure DETX (2,4-Diethylthioxanthone), both available from Rahn USA. When present, the radiation curable inkjet ink may contain less than about 3 wt. %, preferably less than about 2 wt. %, preferably less than about 1 wt. % of the photosensitizer.

Suitable free-radical photoinitiators that may be optionally included in the radiation curable inkjet inks include 2-benzyl-2-(dimethylamino)-4'-morpholinobutyrophenone, 2-hydroxy-2-methylpropiophenone, trimethylbenzophenone, methylbenzophenone, 1-hydroxycyclohexylphenyl ketone, isopropyl thioxanthone, 2,2-dimethyl-2-hydroxy-acetophenone, 2,2-dimethoxy-2-phenylacetophenone, 2-methyl-1-[4-(methylthio)phenyl]-2-morpholino-propan-1-one, 2,4,6-trimethylbenzyl-diphenyl-phosphine oxide, l-chloro-4-propoxythioxanthone, benzophenone, bis(2,6-dimethoxybenzoyl)-2,4,4-trimethyl pentyl phosphine oxide, 5,7-diiodo-3-butoxy-6-fluorone, ethyl 2,4,6-trimethylbenzoylphenylphosphinate, oxy-phenyl-acetic acid 2-[2-oxo-2-phenyl-acetoxy-ethoxy]-ethyl ester and oxy-phenyl acetic acid 2-[2-hydroxy-ethoxy]-ethyl ester, 1-phenyl-2-hydroxy-2-methyl propanone, bis(2,4,6-trimethylbenzoyl)phenylphosphine oxide, camphorquinone, polymeric photoinitiators such as polymeric benzophenone Genopol BP-2 (Rahn U.S.A.), Omnipol BP, Omnipol SZ, Omnipol BL 801 T, Omnipol 801S, Omnipol BPLV (from IGM resins) and the like. Combinations and sub-sets, comprising one or more the foregoing may also be used. Suitable commercially available photoinitiators include, but are not limited to Omnirad 73, Omnirad 819, Omnirad BDK, Omnirad TPO-L, Omnirad 659, and Omnirad 754 (available from IGM Resins), Methyl benzoylformate (Genocure MBF), Genocure PMP, Genocure BDMM, Genocure CPK, Genocure TPO (available from Rahn U.S.A. Corp, Aurora, Ill.), H-Nu 470, H-Nu 535, H-Nu 635, H-Nu 640, and H-Nu 660 (available from Spectra Group Limited, Millbury, Ohio).

The radiation curable inkjet inks may optionally include, or may be substantially free of non-reactive oligomers (i.e., oligomers which do not contain ethylenically unsaturated radiation curable functional groups), preferably non-reactive oligomers having a number average molecular weight of more than about 10,000 g/mol.

In some embodiments, the radiation curable inkjet inks are substantially non-aqueous, meaning that no water is added to the radiation curable inkjet inks other than the incidental amounts of moisture derived from ambient conditions. In such embodiments, the radiation curable inkjet inks are substantially free of water and have less than about 3 wt. %, preferably less than about 2 wt. %, preferably less than about 1 wt. %, preferably less than about 0.1 wt., preferably less than about 0.05 wt. % of water, based on the total weight of the radiation curable inkjet ink.

In some embodiments, the radiation curable inkjet inks are substantially free of organic solvents, which may include, but are not limited to: alcohols, for example alcohols containing 1 to 4 carbon atoms, such as methanol, ethanol, butanol, propanol, and isopropanol; glycol ethers such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-isopropyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-2-methoxybutanol, propylene glycol monomethyl ether, propylene glycol monoethyl ether, propylene glycol mono-t-butyl ether, propylene glycol mono-n-propyl ether, propylene glycol mono-isopropyl ether, propylene glycol mono-n-butyl ether, dipropylene glycol mono-n-butyl ether, dipropylene glycol monomethyl ether, dipropylene glycol monoethyl ether, dipropylene glycol mono-n-propyl ether, and dipropylene glycol mono-isopropyl ether; ethers (non-glycol ethers), for example ethers containing 4 to 8 carbon atoms such as diethyl ether, dipropyl ether, methyl tert-butyl ether, dibutyl ether, dioxane, and tetrahydrofuran; ketones, for example ketones containing 3 to 6 carbon atoms, including acetone, methyl ethyl ketone and cyclohexanone; esters, including those having 3 to 6 carbon atoms, for example methyl acetate, ethyl acetate and n-butyl acetate; amides such as formamide and acetamide; sulfoxides, for example dimethylsulfoxide; and mixtures of two or more thereof.

The proportions of the components described above can be controlled to obtain desirable properties, specifically ink compositions suitable for use in the methods described herein for improving the surface characteristics of substrates, thereby forming sharp, clear, high quality images on those substrates, while increasing printing speeds and reducing energy costs associated with in-line primer coating applications.

In some embodiments, the radiation curable white inkjet ink composition includes a radiation curable anti-wrinkle agent, a mono-ethylenically unsaturated monomer, a poly-ethylenically unsaturated component, a surfactant, and a white pigment, and optionally at least one additive. In preferred embodiments, a weight ratio of the mono-ethylenically unsaturated monomer to the poly-ethylenically unsaturated component is at least about 1:1, preferably at least about 1.1:1, more preferably at least about 1.2:1, even more preferably at least about 1.3:1, and up to about 3:1, preferably up to about 2:1, preferably up to about 1.8:1, preferably up to about 1.6:1, more preferably up to about 1.5:1, even more preferable up to about 1.4:1. Preferably, the radiation curable white inkjet ink includes 15 to 25 wt. % of a radiation curable anti-wrinkle agent (e.g., PETIA), 20 to 30 wt. % of a poly-ethylenically unsaturated component, which is a poly-ethylenically unsaturated monomer such as an acrylate monomer of a propoxylated alcohol (e.g., SR9003B), 25 to 35 wt. % of a mono-ethylenically unsaturated monomer, which is an acrylate of a cyclic alkyl alcohol (e.g., SR420), 0.5 to 3 wt. % of a surfactant, which is a polyacrylate-based surfactant (e.g., Byk-361N), and 26-32 wt. % of a colorant, for example a white pigment dispersion (e.g., XU516), each relative to the total weight of the radiation curable white inkjet ink composition.

Once a primer coating has been applied to form a print receptive surface with a desired surface roughness, any ink composition may be subsequently applied without limitation. That is, the primer coating provides a print receptive surface that enables a wide variety of inks to be subsequently applied. By way of example, when a radiation curable white inkjet ink composition is applied, forming a coated substrate with acceptable surface roughness, a wide range of different radiation curable CMYK ink compositions may then be applied. Even though the order of white inkjet ink followed by CMYK inkjet ink is recited herein, it should be noted that the application order of color (or clear coat) may be reversed or modified, so long as the primer coating contains the radiation curable anti-wrinkle agent capable of forming a smooth, print-receptive surface. For example, the method may involve applying a radiation curable CMYK inkjet ink composition comprising the radiation curable anti-wrinkle agent, thereby forming a colored primer coating with acceptable surface roughness after being pinned, and which is capable of receiving any subsequent ink (e.g., radiation curable white inkjet ink).

Embodiments of the radiation curable inkjet inks described herein may be prepared by any suitable technique known to those of ordinary skill in the art, for example by combining one or more of the mono-ethylenically unsaturated oligomer, the mono-ethylenically unsaturated monomer, the poly-ethylenically unsaturated component, the radiation curable anti-wrinkle agent, the acrylate ester of a carboxylic acid, the anti-kogation agent, the colorant, and the surfactant in any order and stirring at a temperature between 20 and 100° C. until a homogeneous solution is formed. Any desired additive (e.g., a stabilizer, an adhesion promoter, a security taggant) may also be included in this mixture, or alternatively be mixed into the homogeneous solution with optional stirring, agitating, and/or homogenization. The formed radiation curable inkjet inks may then be filtered, optionally at an elevated temperature, to remove extraneous particles.

Properties

The radiation curable inkjet inks disclosed herein have acceptable viscosity and surface tension in a liquid state, and after curing, produce cured ink compositions with low surface roughness that enables production of clear, high quality prints with good adhesion, rub and scratch resistance, gloss, and low migration.

As used herein, the term "viscosity" refers to a complex viscosity, which is the typical measurement provided by a mechanical rheometer that is capable of subjecting a sample to a steady shear strain or a small amplitude sinusoidal deformation. In this type of instrument, the shear strain is applied by a motor and the sample deformation (torque) is measured by the transducer. Examples of such instruments are the Rheometrics Fluid Rheometer RFS3, ARES rheometer, both made by Rheometrics, a division of TA Instruments, or a Haake Roto Visco 1 rheometer, Brookfield DV-E Viscometer made by AMETEK Brookfield and a TCP/P-Peltier Temperature Control Unit. The results are provided in centipoise (cP). In some embodiments, the radiation curable inkjet inks exhibit a desirable low viscosity in liquid form, i.e., they have a viscosity at 25° C. of less than 50 cPs, more preferably less than 30 cPs, even more preferably less than about 20 cPs, yet even more preferably less than about 10 cPs, yet even more preferably less than about 5 cPs, yet even more preferably less than about 4 cPs, yet even more preferably less than about 3 cPs, yet even more preferably less than about 2 cPs, yet even more preferably less than about 1 cPs, for example a viscosity from about 1 to about 5 cPs, preferably from about 2 to about 4 cPs.

In some embodiments, the radiation curable inkjet inks have a surface tension of at least about 20 mN/m, more preferably at least about 22 mN/m, and up to about 50 mN/m, preferably up to about 40 mN/m, more preferably up to about 30 mN/m at a jetting temperature of from about 25° C., preferably from about 35° C., more preferably from about 40° C. and less than about 100° C., preferably less than about 95° C., more preferably less than about 90° C.

"Surface roughness" as used herein is a measurement of a surface microstructure that describes the unevenness of surface height across a pre-defined measurement length (lm). The surface roughness is measured by a roughness tester that includes a stylus, such as portable roughness tester PCE-RT-11 made by PCE Americas Inc., which is commercially available from PCE Americas Inc., Jupiter/Palm beach, Florida. Measurements of the surface substructure (i.e., peaks and valleys of the surface) are made according to $R_z$, $R_t$, and $R_a$ parameters. $R_z$ is the average roughness depth and is measured as the mean of the highest peak to lowest valley distances from five successive sample lengths (lo) where lo is lm/5. $R_t$ is the maximum roughness depth and is the greatest perpendicular distance between the highest peak and the lowest valley within the measurement length lm. $R_a$, or average roughness, is the arithmetic mean of the absolute values of the peak heights and valley depths within the measurement length (lm). The measuring length (lm) can be preselected, but is typically less than about 6 mm, preferably less than about 4 mm.

To test the surface roughness, the stylus is mechanically drawn across the measurement length of the testing surface to provide readouts for $R_z$, $R_t$, and $R_a$. To provide an accurate assessment of the surface roughness across the entire area of interest (i.e., the substrate surface that will receive the white inkjet ink composition, or the coated substrate surface that will receive the CMYK inkjet ink composition), the surface roughness measurement is taken at least 5 times, preferably at least 8 times, more preferably at least 10 times, at various locations across the area of interest and the acquired $R_z$, $R_t$, and $R_a$ parameters are averaged. To ensure a proper surface roughness sampling, the area of interest is divided into approximately equal subsections corresponding to the number of measurements taken, and one surface roughness measurement is obtained from each subsection, e.g., the area of interest is divided into 10 subsections, the surface roughness parameters $R_z$, $R_t$, and $R_a$ are obtained from each of the 10 subsections and averaged.

An adequately low surface roughness, (i.e., a surface with suitable smoothness) is achieved when the arithmetical mean surface roughness value $R_a$ is less than or equal to 2.0 micrometers and the arithmetical mean surface roughness depth $R_z$ is less than or equal to 10.0 micrometers. The radiation curable white inkjet ink composition disclosed herein produces, after pinning, a coated substrate which meets these requirements, and thus the methods described herein are capable of forming sharp, clear, high quality images with fast printing speeds and low energy costs.

The radiation curable inkjet inks of the present disclosure provide suitable rub resistance after being cured. Inks exhibiting rub resistance exhibit improved processability, in which the printed substrate can be subjected to further processing without detrimental effect to the printed ink. Rub resistance may be analyzed for example with a Gakushin-type rubbing tester manufactured by Daiei Kagaku, based on reference standard JIS L-0849. The test typically involves placing a reference white cloth on rubbing heads of the rubbing tester. The rubbing heads exert pressure for a number of cycles on the cured ink due to their weight. Depending upon the rub resistance of the ink, the color of the ink will transfer to the reference cloth to a lesser or greater extent. The rub resistance is quantified by measuring the color difference $\Delta E$ after rubbing on the reference cloth by a Spectrophotometer, such as the X-Rite Ci64. The present radiation curable inkjet inks have $\Delta E$ value of less than 3.0, which is generally regarded as acceptable, preferably a $\Delta E$ value of less than 2.0, and even more preferably a $\Delta E$ value of less than 1.0.

Adhesion can be measured by a cross hatch adhesion tape test according to ASTM D3359 and quantified on a 0-5 scale. The radiation curable inkjet inks provide advantageous adhesion properties on a variety of substrates, with adhesion performance ratings of 3 to 5, preferably 4 to 5.

The scratch resistance properties of the radiation curable inkjet inks, after being cured, may be analyzed by pencil hardness tests, for example with standard ASTM3363-92a, and rated on a scale of softest to hardest: 6B, 5B, 4B, 3B, 2B, B, HB, F, H, 2H, 3H, 4H, 5H, 6H, 7H, 8H, 9H. In some embodiments, the radiation curable inkjet inks provide suitable scratch resistance ratings of at least "B" hardness, preferably at least "HB", more preferably at least "F", even more preferably at least "H", yet even more preferably at least "2H".

Inks to be used on food packaging should not contaminate the food or impart any unnatural odor. Contamination, in this context, can result from migration of components of an ink into the foodstuff or other packaged material or from undesirable odors imparted to the packaged material by the ink. Migration of ink components into foodstuffs or pharmaceuticals may present a health risk and consequently should be kept to a minimum. Several food packaging regulations and guidelines exist which provide listings of acceptable ink components as well as stipulations regarding acceptable levels of migration (e g., the European Printing Ink Association (EuPIA) and associated GMP guidelines EuPIA Inventory List 2012, Swiss Ordinance on Materials and Articles in Contact with Food, SR 817.023.21, Nestle Guidance Notes, FDA Title 21 CFR or FCN—Food Contact Notification). Specific migration limits (SML) of consumer product packaging inks are typically below 50 ppb and sometimes migration levels below 10 ppb are required.

The migration levels of the radiation curable inkjet inks disclosed herein may be determined using migration testing standards known to those of ordinary skill in the art. Briefly, such analyses may involve stacking several sheets of printed samples, or alternatively cutting a printed sample from the rewind side of a substrate in a roll form web as the test specimen, and conditioning the test specimen in an extraction cell (generally ranging from 30 minutes to 10 days) filled with a food stimulant (e.g., water, heptane, isooctane, vegetable oil, ethanol or acetic acid solutions, etc.) according to FDA "Conditions of Use" regulations as defined in Title 21 Code of Federal Regulations (C.F.R.) Section 176.170(c)-(d), Apr. 1, 2000, which specify the testing conditions (e.g., temperature and length of time) for which the test specimen is stored in the extraction cell depending on the intended use of a particular packaged product. After conditioning, any ink components from the test specimen may optionally be extracted with an extraction solvent (e.g., chloroform, methylene chloride). The levels of migration of the ink components may then be quantified with various analytical techniques, such as by weight, gas chromatography, liquid chromatography, mass spectrometry, elemental analysis, and the like. The exact technique used to measure the amount of migration will depend on the intended use of a particular packaged product. For example, if the package is intended to be used for frozen storage (no thermal treatment in the container), the migration is measured by condition of use "G" according to Table 2 of Title 21 Code of Federal Regulations (C.F.R.) Section 176.170(c) and Section 176.170(d). If the package has multiple intended uses, the package satisfies the migration level for the appropriate test for at least one of the intended uses.

In some embodiments, the radiation curable inkjet inks disclosed herein exhibit a migration level of less than 50 ppb, preferably less than 40 ppb, preferably less than 30 ppb, preferably less than 20 ppb, more preferably less than 10 ppb, even more preferably less than 5 ppb, yet even more preferably less than 1 ppb, after being cured on an article. In some embodiments, the radiation curable inkjet inks, after being cured, exhibit no migration and/or the ink components cannot be detected above the detection limit of the analytical technique employed.

A glossmeter provides a quantifiable way of measuring gloss intensity ensuring consistency of measurement by defining the precise illumination and viewing conditions. The configuration of both illumination source and observation reception angles allows measurement over a small range of the overall reflection angle. The measurement results of a glossmeter are related to the amount of reflected light from a black glass standard with a defined refractive index. The ratio of reflected to incident light for the specimen, compared to the ratio for the gloss standard, is recorded as gloss units (GU). Measurement angle refers to the angle between the incident light and the perpendicular. Three measurement angles (20°, 60°, and 85°) are specified to cover the majority of industrial coatings applications. The angle is selected based on the anticipated gloss range, with high gloss being a 60° value of >70 GU, medium gloss being a 60° value of 10 to 70 GU, and low gloss being a 60° value of <10 GU.

For most test specimens, gloss is measured at a 60 degree angle (specular reflection) using a BYK-Gardner haze-gloss reflectometer (BYK-Gardner Geretsiried, Germany) according to ASTM D523 for coatings, plastics, and related materials and TAPPI T480 for paper substrates. In preferred embodiments, the radiation curable white inkjet ink compositions, after curing, have a medium to low gloss rating, i.e., a GU of less than 25, preferably less than 20, more preferably less than 15, even more preferably less than 10, yet even more preferably less than 5. In other preferred embodiments, the radiation curable CMYK inkjet ink compositions, after curing, have a medium to high gloss rating, i.e., a GU of at least 50, preferably at least 60, more preferably at least 70, even more preferably at least 75 and up to 90, preferably up to 80.

Acceptable image clarity or overall image quality can be determined through simple visual inspection of the formed images or by using image clarity software known by those of ordinary skill in the art, for example, Personal Image Analysis System (PIAS) software.

Method of Forming an Image

The present disclosure provides a method of forming an image by applying the radiation curable white inkjet ink composition, in one or more of its embodiments, onto a surface of the substrate, pinning the radiation curable white inkjet ink composition with UV light to form a coated substrate with a smooth surface, applying a radiation curable CMYK inkjet ink composition, in one or more of its embodiments, onto the coated substrate, and exposing the pinned radiation curable white inkjet ink composition and the radiation curable CMYK inkjet ink composition to electron beam radiation.

Various modifications of the method described above are also possible and the following description is equally applicable to such variations or modifications. For example, while the method preferably involves the order described above, it should be readily understood that the method may also involve the reverse order of application of inks onto the substrate. That is, the method may involve applying the radiation curable CMYK inkjet ink composition comprising the radiation curable anti-wrinkle agent onto a surface of the substrate, pinning the radiation curable CMYK inkjet ink composition with UV light to form a coated substrate with a smooth surface, applying a radiation curable white inkjet ink composition, in one or more of its embodiments, onto the coated substrate, and exposing the pinned radiation curable CMYK inkjet ink composition and the radiation curable white inkjet ink composition to electron beam radiation. In another example, a colorless coating composition can be used in lieu of, or in addition to, the radiation curable white inkjet ink composition or the radiation curable CMYK inkjet ink composition. Therefore, the method may involve any order of CMYK, white, clear, spot color, etc. as long as the ink acting as the primer coat in direct contact with the substrate contains a suitable content of the radiation curable anti-wrinkle agent and is capable of forming a print-receptive surface after being pinned.

Substrate

The substrate may be a three dimensional part as well as flat sheets or webs that are supplied in roll form, and may form printed articles suitable for graphic arts, textiles, packaging, lottery, business forms and publishing industries, examples of which include a tag or label, a lottery ticket, a publication, packaging (e.g., flexible packaging), a folding carton, a rigid container (e.g., a plastic cup or tub, glass containers, metal cans, bottles, jars, and tubes), a point-of-sale display, and the like.

Due to the ability of the radiation curable white inkjet ink composition to consistently form a print-receptive, smooth surface, both porous and non-porous substrates can be used in the disclosed methods. Examples of porous substrates include, but are not limited to, paper, wood, membranes, and fabrics (including, for example, but not limited to, woven fabric, non-woven fabric, and foil-laminated fabric). Non-porous substrates may include various plastics, glass, metals, and/or coated papers, such as molded plastic parts, as well a flat sheets or rolls of plastic films. Examples include those containing polyethylene terephthalate (PET), biaxially oriented polystyrene (OPS), polyethylene (PE), polypropylene (PP), oriented polypropylene (OPP), polylactic acid (PLA), oriented nylon, polyvinyl chloride (PVC), polyester, cellulose triacetate (TAC), polycarbonate, polyolefin, acrylonitrile butadiene styrene (ABS), polyacetal and polyvinyl alcohol (PVA), and the like. In preferred embodiments, the substrate is a plastic substrate. The methods disclosed herein may be used for printing packaging (e.g., flexible packaging), preferably food/product packaging (e.g., primary, secondary, or tertiary food packaging) which may contain food products, non-food products, pharmaceutical, and/or personal care items, which is enabled by the low migration (less than 10 ppb) of the cured ink composition into the packaged product/item.

The substrate may have a flat surface, a structured surface (e.g., a grained surface with a high surface roughness), and a three-dimensional surface, such as curved and/or complex surfaces. In some embodiments, the substrate, or the area of interest of the substrate (i.e., the portion of the substrate that will receive the radiation curable white inkjet ink composition) has a high surface roughness with an arithmetical mean surface roughness value $R_a$ of greater than 2.0 micrometers, or greater than 4.0 micrometers, or greater than 8.0 micrometers, and up to 40.0 micrometers, or up to 30.0 micrometers, or up to 20.0 micrometers and an arithmetical mean surface roughness depth $R_z$ of greater than 10.0 micrometers, or greater than 15.0 micrometers, or greater than 20.0 micrometers, and up to 50.0 micrometers, or up to 40.0 micrometers, or up to 35.0 micrometers. Application of the radiation curable white inkjet ink composition and subsequent pinning advantageously lowers the substrate surface roughness to an acceptable level for reception of the radiation curable CMYK inkjet ink composition, thus enabling high quality prints.

Alternatively, when a substrate is employed that has a relatively smooth surface, that is, an arithmetical mean surface roughness value $R_a$ of less than or equal to 2.0 micrometers and an arithmetical mean surface roughness depth $R_z$ of less than or equal to 10.0 micrometers, the radiation curable white inkjet ink composition maintains the low surface roughness parameters after being pinned, and may improve contrast and adhesion between the applied radiation curable inkjet inks.

Application of Radiation Curable Inkjet Inks

Any printhead known to those of ordinary skill in the art of inkjet printing can be used as printing units in the present method, including continuous printheads, thermal printheads, piezoelectric printheads, and acoustic printheads. The type of printhead used to apply the radiation curable white inkjet ink composition and the radiation curable CMYK inkjet ink composition may be different, or may be the same. Preferably, drop on demand piezoelectric printheads are used for application of both radiation curable inkjet inks. Typical parameters, such as drop speed, printhead temperature, control voltage and control pulse width, can be adjusted according to the specification of the printhead. Printheads which are generally suitable for usage in the methods herein have a droplet size in the range of 2 to 80 pL and a droplet frequency in the range of 10 to 100 kHz, although values above or below these ranges may also be used. In some embodiments, the radiation curable inkjet inks are jetted at temperatures of less than about 100° C., such as from about 25° C. to about 100° C.

Any currently constructed printing line may be easily adapted to perform the methods described herein, for example, by simply adding a primer inking station (and UV pinning unit) before an inking station to apply colored inks. The radiation curable white inkjet ink composition may be applied so as to substantially cover the substrate surface (i.e., greater than 90%, preferably greater than 95% of the substrate surface area is covered with the radiation curable white inkjet ink composition), or to partially cover the substrate surface (i.e., up to 90%, preferably up to 75%, more preferably up to 50% of the substrate surface area is covered with the radiation curable white inkjet ink composition, for example, 5 to 70% or 10 to 30%).

Further, the thickness of the applied radiation curable white inkjet ink composition can be adjusted depending on the surface roughness of the substrate, for example, through application of more or less of the ink, or by adjusting the number of primer coatings applied using either a multi-pass method to apply two or more coatings (e.g., two, three, four, etc.) or a single-pass-method to apply one primer coating. In preferred embodiments, after pinning the radiation curable white inkjet ink composition, the method provides a pinned radiation curable white inkjet ink composition with a thickness of at least 2 micrometers, preferably at least 4 micrometers, preferably at least 6 micrometers, preferably at least 8 micrometers, more preferably at least 10 micrometers, even more preferably at least 12 micrometers, yet even more preferably at least 14 micrometers, and up to 50 micrometers, preferably up to 40 micrometers, more preferably up to 30 micrometers, even more preferably up to 25 micrometers, yet even more preferably up to 20 micrometers.

After the radiation curable white inkjet ink composition has been applied to the substrate and pinned to form a coated substrate, the radiation curable CMYK inkjet ink composition is then applied onto the pinned radiation curable white inkjet ink composition to any desired coverage level, that is, to substantially cover (i.e., greater than 90%, preferably greater than 95% surface area coverage) or preferably partially cover (i.e., up to 90%, preferably up to 75%, more preferably up to 50% surface area coverage) the pinned radiation curable white inkjet ink composition, depending on the desired image and printed article application. In preferred embodiments, application of the radiation curable CMYK inkjet ink composition does not materially affect the surface roughness properties of the coated substrate.

Pinning

In between application of the radiation curable white inkjet ink composition and the radiation curable CMYK inkjet ink composition, the radiation curable white inkjet ink composition is pinned by exposing to UV light. While UV pinning methods typically rely on UV light having a wavelength of 230 to 400 nm, the inventors have discovered that short-wave UV light having a wavelength of less than 200 nm, preferably less than 190 nm, more preferably less than 180 nm, even more preferably less than 175 nm, for example from 160 to 175 nm, preferably from 165 to 172 nm produces the most advantageous surface smoothening results. Any UV light source known to those of ordinary skill that is capable of producing such wavelengths may be used herein, however, it is preferable to use a light emitting diode (LED) UV light source, and more preferably a collimated LED UV light source. Further, the UV light source can be present in a separate pinning station, whereby the substrate travels from a primer inking station to the separate pinning station, or alternatively the UV light source is mounted directly on the same carriage that carries the print heads, and the radiation curable white inkjet ink composition is pinned shortly after being jetted.

In preferred embodiments, the radiation curable white inkjet ink composition is substantially free of photoinitiators and thus exposure to UV light results in only partial curing (i.e., pinning). Partial curing has several advantages. First, partial curing allows the pinned radiation curable white inkjet ink composition to form a receptive base for the subsequently applied radiation curable CMYK inkjet ink composition, thus improving adhesion between the inks after curing and enabling good print quality. In contrast, a full cure or a complete drying step in between inking stations is both time-consuming and costly. Pinning the radiation curable white inkjet ink composition with short-wave UV light on the other hand, requires little energy (i.e., less than 60 mW/cm$^2$, preferably less than 50 mW/cm$^2$, preferably less than 40 mW/cm$^2$, preferably less than 30 mW/cm$^2$), and can be accomplished by a single high-speed pass under the UV light (e.g., at least 0.5 m/sec, preferably at least 1 m/sec, more preferably at least 1.5 m/sec), thus having little effect on the overall time of the production run.

Exposing the radiation curable white inkjet ink composition, in one or more of its embodiments, to such short-wave UV light produces a coated substrate with an arithmetical mean surface roughness value $R_a$ of less than or equal to 2.0 micrometers, preferably less than or equal to 1.8 micrometers, preferably less than or equal to 1.6 micrometers, preferably less than or equal to 1.4 micrometers, preferably less than or equal to 1.3 micrometers, preferably less than or equal to 1.29 micrometers, for example from 0.5 to 1.5 micrometers, more preferably from 0.8 to 1.3 micrometers, even more preferably from 0.9 to 1.2 micrometers, and an arithmetical mean surface roughness depth $R_z$ of less than or equal to 10.0 micrometers, preferably less than or equal to 9.0 micrometers, preferably less than or equal to 8.0 micrometers, preferably less than or equal to 7.0 micrometers, preferably less than or equal to 6.0 micrometers, preferably less than or equal to 5.0 micrometers, preferably less than or equal to 4.0 micrometers, for example from 2.0 to 7.0 micrometers, preferably from 3.0 to 7.0 micrometers, more preferably from 3.5 to 7.0 micrometers. The resulting surface roughness enables the radiation curable CMYK inkjet ink composition to be applied with uniform ink density coverage and acceptable adhesion for the production of high quality prints with sharp lines and desirable color rendition.

Surprisingly, it has been found that inclusion of adequate amounts (e.g., about 15 to about 40 wt. %) of a radiation curable anti-wrinkle agent (e.g., a mixture of pentaerythritol triacrylate monomer and pentaerythritol tetraacrylate monomer) in the radiation curable white inkjet ink composition produces such advantageous surface roughness properties after being pinned by short-wave UV light. This result is unexpected because replacing the radiation curable anti-wrinkle agent with radiation curable poly-ethylenically unsaturated components having the same or a similar number of reactive functional groups (e.g., acrylates) does not produce the same surface smoothening results.

Electron Beam Curing

After applying the radiation curable CMYK inkjet ink onto the coated substrate, the method next involves curing both the pinned radiation curable white inkjet ink and the radiation curable CMYK inkjet ink by exposing to actinic radiation and/or by electron beam radiation, preferably electron beam radiation. Upon exposure to electron beam radiation, curing of the unreacted radiation curable groups in the pinned radiation curable white inkjet ink is completed, with concurrent curing (e.g., complete curing) of the radiation curable CMYK inkjet ink composition.

In electron beam curing methods, electrons emerge from a vacuum chamber through a metal foil and reach the radiation curable inkjet ink on the substrate in a reaction chamber. Electron beam curing processes typically generate little heat and thus help prevent substrate distortion from thermal processing or processes requiring raised temperatures. The radiation curable inkjet inks may be exposed to electron beams using any electron beam generator, such as electron beam generators available from Electron Crosslinking AB (Sweden), Comet AG (Switzerland) or Energy Sciences, Inc. (ESI) (USA). The electron beam generator may be arranged in combination with the printheads of the inkjet printers, so that both the pinned radiation curable inkjet ink and the radiation curable CMYK inkjet ink composition are exposed to curing radiation shortly after the latter is jetted.

In some embodiments, the pinned radiation curable white inkjet ink composition and the radiation curable CMYK inkjet ink composition are exposed to a low dose of electron beam radiation to form an image, such as from about 0.1 Mrad, preferably from about 0.2 Mrad, preferably from about 0.3 Mrad, preferably from about 0.4 Mrad, preferably from about 0.5 Mrad, and up to about 1.3 Mrad, preferably up to about 1.2 Mrad, preferably up to about 1.1 Mrad, or more preferably up to about 1.0 Mrad. In some embodiments, an image is formed by exposing the pinned radiation curable white inkjet ink composition and the radiation curable CMYK inkjet ink composition to a higher dose of electron beam radiation, for example, from about 1 Mrad, preferably from about 1.2 Mrad, preferably from about 1.5 Mrad, preferably from about 1.6 Mrad, preferably from about 1.7 Mrad, up to about 10 Mrad, preferably up to about 8 Mrad, preferably up to about 6 Mrad, or more preferably up to about 3 Mrad, or a combination of low dose and high dose electron beam radiation. The dose of electron beam radiation can be adjusted based on the dimensions and surface characteristics of the substrate, the coating thickness of the pinned radiation curable white inkjet ink composition, and/or the desired level of curing, for example by reducing or increasing the dosage and exposure time.

Various electron beam accelerating potentials may be employed in the methods disclosed herein, however, an accelerating potential of less than 300 kV is typically used, preferably less than 260 kV, more preferably less than 240 kV, more preferably less than 220 kV, for example in the range of about 70 to about 200 kV.

The method of the present disclosure may optionally include supplying an inert gas during electron beam curing to displace oxygen ("inerting") which inhibits free-radical polymerization. In some embodiments, less than about 200 ppm, preferably less than about 180 ppm, preferably less than about 160 ppm, preferably less than about 140 ppm oxygen is present in the reaction chamber during curing. Any suitable inert gas may be used including, but not limited to, nitrogen gas and argon gas.

Further, it is noted that a drying step is optional in the disclosed methods as the radiation curable inkjet inks of the present disclosure are preferably non-aqueous. When the methods involve a drying step, either of the applied radiation curable inkjet inks may be dried for about 10 seconds or less, preferably about 7 seconds or less, more preferably about 4 seconds or less, even more preferably about 2 seconds or less, yet even more preferably about 1 second or less, under ambient conditions, prior to application of another coating of ink or prior to exposing to pinning radiation (e.g., UV light) or curing radiation (e.g., electron beam radiation). In a preferred embodiment, the method does not include a drying step, other than the amount of time it takes to deliver the substrate from an inking station to the pinning or curing station (e.g., the electron beam generator).

It should also be recognized that substrate surface treatments such as corona treatment, atmospheric plasma treatment, and flame treatment may optionally be employed in the methods herein prior to application of the radiation curable inkjet inks to improve printed article characteristics, for example ink adhesion. These surface treatment processes may take place in-line (i.e., during the production run) or off-line (i.e., the substrate is surface treated prior to the production run, for example during the manufacturing of the substrate at a separate facility). The parameters of such substrate surface treatments may be varied greatly depending on the substrate material to be printed, the specific radiation curable inkjet inks utilized, the printing method applied, and the desired properties and applications of the printed article.

The examples below are intended to further illustrate radiation curable inkjet inks and surface roughness properties and are not intended to limit the scope of the claims.

EXAMPLE 1 (INVENTIVE)

Preparation of Radiation Curable White Inkjet Ink Sample 220-30-8:

All ingredients were added to a stainless steel container and mixed with a sawtooth blade at 500 rpm for 30 minutes. The ink was then filtered through a 1 micron filter.

TABLE 1

| Ink properties of 220-30-8 | |
| --- | --- |
| Viscosity at 25 C. | 18.9 cP |
| Surface Tension at 25 C. | 29.6 mN/m |

TABLE 2

| Ink formulation of 220-30-8 | | | | |
| --- | --- | --- | --- | --- |
| RAW MATERIAL name | Type | CAS# | Source | EB White Ink Ink#: 220-30-8 % |
| PETIA | monomer | 3524-68-3; 4986-89-4 | Allnex | 15.0 |
| PONPGDA-SR9003 B | monomer | 84170-74-1 | Sartomer | 24.0 |
| SR420 | monomer | 86178-38-3 < 95%, 116-02-9 < 5%, 79-10-7 < 0.1% | Sartomer | 30.0 |
| BYK 361N | surfactant | not available - non hazardous | Byk Chemie | 1.0 |

TABLE 2-continued

Ink formulation of 220-30-8

| RAW MATERIAL name | Type | CAS# | Source | EB White Ink Ink#: 220-30-8 % |
|---|---|---|---|---|
| XU516 | white pigment dispersion in PONPGDA | 84170-74-1 | Kao Collins | 30.0 |
| | | | | 100.0 |

Coated Substrate Preparation:

The substrate used was a coated polyester film, ENS-003-002, available from Glenroy, W158 N9332 Nor-X-Way Avenue, Menomonee Falls, Wis. 53051.

The ink was applied with a number 6 Mayer bar, which is a wet film applicator, which applies 15 microns of ink.

The wavelength of UV used for pinning was 172 nm.

Roughness Testing:

Surface Roughness is measured by using a roughness tester. The tester is moved in a linear uniform motion across the test surface which moves a contact stylus in a perpendicular direction. As the stylus moves up and down over the surface, its motion is converted to electric signals which are transformed into digital signals which get processed into $R_a$ and $R_z$ values. The roughness tester used in these measurements is model number PCE-RT11 made by PCE Americas Inc. 711 Commerce Way Suite 8 Jupiter Fla.-33458 USA.

TABLE 3

Roughness measurements of 220-30-8
Samples of Ink# 220-30-8 pinned with 172 nm UV wavelength

| | Sample L | | Sample M | | Sample S | |
|---|---|---|---|---|---|---|
| | Ra | Rz | Ra | Rz | Ra | Rz |
| | 0.95 | 5.2 | 1.17 | 6.41 | 0.86 | |
| | 0.86 | 4.76 | 1.26 | 6.25 | 0.57 | 3.91 |
| | 0.86 | 4.64 | 1.35 | 7.27 | 0.57 | 3.91 |
| | 0.89 | 4.67 | 1.35 | 7.27 | 0.56 | 3.02 |

TABLE 3-continued

Roughness measurements of 220-30-8
Samples of Ink# 220-30-8 pinned with 172 nm UV wavelength

| | Sample L | | Sample M | | Sample S | |
|---|---|---|---|---|---|---|
| | Ra | Rz | Ra | Rz | Ra | Rz |
| | 0.89 | 4.67 | 1.32 | 6.75 | 0.55 | 3.85 |
| | 0.88 | 4.71 | 1.32 | 6.75 | 0.54 | 3.79 |
| | 0.87 | 4.65 | 1.31 | 6.83 | 0.54 | 3.79 |
| | 0.82 | 4.55 | 1.44 | 8.35 | 0.54 | 3.79 |
| | 0.92 | 4.81 | 1.22 | 6.94 | 0.53 | 3.81 |
| | 0.90 | 5.18 | 1.19 | 6.07 | 0.53 | 3.81 |
| AVERAGE | 0.88 | 4.78 | 1.29 | 6.89 | 0.58 | 3.74 |

Samples L, M, and S represent different coated substrate samples following application and pinning of the radiation curable white inkjet ink composition from Example 1. The surface roughness of each sample was measured 10 times according to the procedures described herein, and the acquired $R_a$ and $R_z$ values were then averaged. All samples provided, after application of radiation curable CMYK inkjet ink and electron beam curing, images with acceptable adhesion, rub and scratch resistance, gloss, migration, and visually acceptable print quality.

EXAMPLES 2 AND 3 (INVENTIVE)

Two examples of inks (220-30-6 and 220-30-7) containing less than 15 wt. % of the anti-wrinkle agent are produced below. Ink samples, coated substrate preparation, wavelength of UV used for pinning, and roughness testing was performed in the same manner as Example 1.

TABLE 4

Ink formulations of 220-30-6 and 220-30-7

| RAW MATERIAL name | Type | CAS# | Source | EB White Ink Ink#: 220-30-6 % | EB White Ink Ink#: 220-30-7 % |
|---|---|---|---|---|---|
| PETIA | monomer | 3524-68-3; 4986-89-4 | Allnex | 5.0 | 10.0 |
| PONPGDA-SR9003 B | monomer | 84170-74-1 | Sartomer | 54.0 | 39.0 |
| SR420 | monomer | 86178-38-3 < 95%, 116-02-9 < 5%, 79-10-7 < 0.1% | Sartomer | 10.0 | 20.0 |
| BYK 361N | surfactant | not available - non hazardous | Byk Chemie | 1.0 | 1.0 |
| XU516 | white pigment dispersion in PONPGDA | 84170-74-1 | Kao Collins | 30.0 | 30.0 |
| | | | | 100.0 | 100.0 |

The ink of 220-30-7 produced coated substrates having higher $R_a$ and $R_z$ values than the ink of 220-30-8. The ink of 220-30-6 produced coated substrates having higher $R_a$ and $R_z$ values than the ink of 220-30-7.

EXAMPLES 4-6 (COMPARATIVE)

Three examples of inks (220-30-9, 220-30-10, and 220-30-11) containing no anti-wrinkle agent are produced below. Ink samples and coated substrate preparation were performed in the same manner as Example 1.

TABLE 5

Ink formulations of 220-30-9, 220-30-10, and 220-30-11

| Code# | RAW MATERIAL name | Type | CAS# | Source | EB White Ink 220-30-9 % | EB White Ink 220-30-10 % | EB White Ink 220-30-11 % |
|---|---|---|---|---|---|---|---|
| E125 | PONPGDA-SR9003 B | monomer | 84170-74-1 | Sartomer | 31.0 | 38.0 | 34.5 |
| E106 | SR420 | monomer | 86178-38-3 <95%, 116-02-9 <5%, 79-10-7 <0.1% | Sartomer | 38.0 | 31.0 | 34.5 |
| R438 | BYK 361N | surfactant | not available - non hazardous | Byk Chemie | 1.0 | 1.0 | 1.0 |
| XU516 | XU516 | White pigment dispersion in PONPGDA | 84170-74-1 | Kao Collins | 30.0 | 30.0 | 30.0 |
| | | | | | 100.0 | 100.0 | 100.0 |

In the absence of the anti-wrinkle agent, UV light having a wavelength <200 nm does not produce pinning or the required surface roughness. These ink formulations (220-30-9, 220-30-10, & 220-30-11) do not get pinned when exposed to 172 nm UV at speeds as low as 1 fpm.

Where a numerical limit or range is stated herein, the endpoints are included. Also, all values and subranges within a numerical limit or range are specifically included as if explicitly written out.

As used herein the words "a" and "an" and the like carry the meaning of "one or more."

Obviously, numerous modifications and variations of the present invention are possible in light of the above teachings. It is therefore to be understood that, within the scope of the appended claims, the invention may be practiced otherwise than as specifically described herein.

All patents and other references mentioned above are incorporated in full herein by this reference, the same as if set forth at length.

The invention claimed is:

1. A method of forming an image on a substrate, comprising:
   applying a radiation curable white inkjet ink composition comprising a radiation curable anti-wrinkle agent onto a surface of the substrate;
   exposing the radiation curable white inkjet ink composition to UV light having a wavelength of less than 200 nm to pin the radiation curable white inkjet ink composition and form a coated substrate having an arithmetical mean surface roughness value $R_a$ of less than or equal to 2.0 micrometers and an arithmetical mean surface roughness depth $R_z$ of less than or equal to 10.0 micrometers;
   applying a radiation curable CMYK inkjet ink composition onto the coated substrate; and
   exposing the pinned radiation curable white inkjet ink composition and the radiation curable CMYK inkjet ink composition to electron beam radiation.

2. The method of claim 1, wherein the exposing to UV light results in partial curing of the radiation curable white inkjet ink composition.

3. The method of claim 1, wherein the electron beam radiation results in complete curing of the pinned radiation curable white inkjet ink composition and the radiation curable CMYK inkjet ink composition.

4. The method of claim 1, wherein the radiation curable white inkjet ink composition is exposed to UV light having a wavelength of less than 175 nm.

5. The method of claim 1, wherein the pinned radiation curable white inkjet ink composition has a thickness of 2 to 50 micrometers.

6. The method of claim 1, wherein the coated substrate has an arithmetical mean surface roughness value $R_a$ of 0.5 to 1.5 micrometers.

7. The method of claim 1, wherein the coated substrate has an arithmetical mean surface roughness depth $R_z$ of 3.5 to 7.0 micrometers.

8. The method of claim 1, wherein the substrate is a plastic substrate.

9. The method of claim 1, wherein the radiation curable anti-wrinkle agent is a poly-ethylenically unsaturated monomer of a polyalcohol which has 3 to 9 carbon atoms.

10. The method of claim 1, wherein the radiation curable anti-wrinkle agent is a pentaerythritol poly-ethylenically unsaturated monomer.

11. The method of claim 1, wherein the radiation curable anti-wrinkle agent is a pentaerythritol poly-acrylate monomer.

12. The method of claim 1, wherein the radiation curable anti-wrinkle agent is a mixture of pentaerythritol poly-acrylate monomers.

13. The method of claim 12, wherein the mixture of pentaerythritol poly-acrylate monomers is a mixture of pentaerythritol triacrylate monomer and pentaerythritol tetraacrylate monomer.

14. The method of claim 13, wherein a weight ratio of pentaerythritol triacrylate monomer to pentaerythritol tetraacrylate monomer in the mixture is about 1:3 to 3:1.

15. The method of claim 1, wherein the radiation curable anti-wrinkle agent is present in an amount of about 15 to about 40 wt. %, based on a total weight of the radiation curable white inkjet ink composition.

16. The method of claim 1, wherein the radiation curable white inkjet ink composition further comprises a mono-ethylenically unsaturated monomer, a poly-ethylenically unsaturated component, a surfactant, and a white pigment.

17. The method of claim 16, wherein the white pigment is present in the radiation curable white inkjet ink composition in an amount of about 1 to about 30 wt. %, based on a total weight of the radiation curable white inkjet ink composition.

18. The method of claim 1, wherein the radiation curable white inkjet ink composition is substantially free of a photoinitiator.

19. The method of claim 1, wherein the radiation curable CMYK inkjet ink composition is substantially free of a photoinitiator.

20. The method of claim 1, wherein the UV light having a wavelength of less than 200 nm is generated from an LED source.

* * * * *